United States Patent [19]
Yokota

[11] Patent Number: 5,291,361
[45] Date of Patent: Mar. 1, 1994

[54] DISK DRIVE WITH LOW ELEVATED HEAD UNLOADING MECHANISM

[75] Inventor: Yuji Yokota, Chichibu, Japan

[73] Assignee: Canon Denshi Kabushiki Kaisha, Saitama, Japan

[21] Appl. No.: 734,263

[22] Filed: Jul. 22, 1991

[30] Foreign Application Priority Data

| Jul. 23, 1990 | [JP] | Japan | 2-194291 |
| Jul. 23, 1990 | [JP] | Japan | 2-194298 |
| Jul. 23, 1990 | [JP] | Japan | 2-194299 |
| Jul. 27, 1990 | [JP] | Japan | 2-200041 |
| Jan. 8, 1991 | [JP] | Japan | 3-011465 |

[51] Int. Cl.$^5$ .................. H02H 1/00; G11B 17/00
[52] U.S. Cl. .................... 360/106; 360/105; 360/99.02
[58] Field of Search .............. 360/103, 104, 105, 102, 360/122, 133, 99.02, 99.05, 99.06

[56] References Cited

U.S. PATENT DOCUMENTS

| 4,549,239 | 10/1985 | Kawajiri | 360/105 |
| 4,605,979 | 8/1986 | Inoue et al. | 360/105 |
| 4,684,913 | 8/1987 | Yaeger | 360/105 |
| 4,709,286 | 11/1987 | Koike | 360/105 |
| 4,737,871 | 4/1988 | Saito | 360/99.02 |
| 5,058,094 | 10/1991 | Suzuki | 360/99.02 |

FOREIGN PATENT DOCUMENTS 219449 9/1990 Japan.

Primary Examiner—Paul M. Dzierzynski
Assistant Examiner—Kim-Kwok Chu
Attorney, Agent, or Firm—Spencer, Frank & Schneider

[57] ABSTRACT

A disk drive for recording data to or reproducing data from a disk includes a head for writing the data into or reading the data out of the disk by sliding on the disk or gliding over the disk. An arm member holds the head which is supported by an elastic member so that the arm member can be raised or lowered. A load force is exerted on a first position of the arm member by a so as to place the head on the disk or to make the head approach the disk. An unload force is exerted on a second position of the arm member so as to separate the head from the disk. The second position is more distant from the head than the first position from the head in a longitudinal direction of the arm member.

16 Claims, 40 Drawing Sheets

DISK DRIVE WITH LOW ELEVATED HEAD UNLOADING MECHANISM

BACKGROUND OF THE INVENTION

1. Field of the Invention

The present invention relates to a disk drive for recording to or reproducing from a disk, and particularly to a disk drive preferably used as an external storage of electronic apparatuses such as personal computers, word processors or the like.

2. Description of the Prior Art

Disk drives carry out recording to or reproducing from disk-shaped recording media such as magnetic disks, laser disks or the like. The disk drive is constructed to perform recording to or reproducing from a disk as follows: a disk, the recording medium, is inserted into the disk drive and is ejectably loaded thereto; the disk is rotated by a driving motor; heads are made to come into contact with or made to approach a surface of the disk; and writing data into or reading data out of the disk is carried out with the heads moving. In this case, the heads are mounted on a carriage which is moved by a driving motor, so that the heads are moved on the disk in the radial direction (seek operation). An example of the disk drive is shown in Japanese Patent Application Laying-open No. 219,449/1990 (U.S. Ser. No. 07/392,045).

The disk drive comprises on a base that supports respective component parts of the disk drive, an installation and removal means for installing or removing the disk, a disk rotation drive means for rotating the disk by the motor, a head seek means for moving heads on the disk in the radial direction to place the heads on a target track, a head loading means for loading or unloading the head to or from the disk, and the like. In addition, there are provided a control circuit for controlling the entire disk drive, and a connector for a power supply. The control circuit is connected to a host computer system via an interface so that the control circuit receives data from and supplies data to the host computer system.

In general, the installation and removal means has a cassette guide that supports a disk cassette in which the disk is housed, and guides the disk cassette into the disk drive so as to install it on the disk rotation drive means and guides the disk cassette out of the disk drive so as to remove it from the disk rotation drive means, a slide plate that has a cam portion which engages a part of the cassette guide to lower or raise it, and is movable in directions in which the disk cassette is installed or removed, and a latch member that controls an ejection of the disk cassette in response to the movement of the slide plate. The disk drive has a shutter opening means for opening a shutter of the disk cassette by engaging the shutter in accordance with the installation of the disk cassette. The shutter opening means are arranged so that the latch member functions as a engaging member which engages the shutter, or are arranged so that the engaging member, which is rotatably supported to the cassette guide, can engage the shutter.

The head loading means, on the other hand, has head arms which support the heads on an end thereof respectively and head loading springs: one of the head arms is vertically rotatably mounted on fulcrums provided in a carriage which moves for the seek operation, and is pressed towards the disk by the loading springs so that the head is loaded, or is rotated upwards with the elevation of the cassette guide so that the head is unloaded.

Components described above of the disk drive are housed in the base shaped like a box, the opening of which is covered by a cover for providing a dustproof, magnetic shield.

When such disk drives are used as external storage of the electronic apparatuses such as personal computers or word processors, they are sometimes constructed as independent apparatuses. In general, however, they are incorporated into the main bodies of the electronic apparatuses. As the electronic apparatuses reduce their size and increase their portability, reduction in size, weight and thickness of the disk drives is increasingly required.

In the head loading means of the conventional disk drive, when the head is unloaded (elevated), the head arm is rotated about the fulcrum while maintaining its linear shape. This presents a problem that the tips of the head arms are elevated high, and hence the thickness (the height) of the disk drive becomes large.

SUMMARY OF THE INVENTION

It is an object of the present invention to provide a disk drive that can reduce, with a simple arrangement, the height or thickness of a disk drive by restricting the swing of the head arms during the head elevation.

In the first aspect of the present invention, a disk drive for recording data to and/or reproducing data from a disk comprises:

a head for writing the data into and/or reading the data out of the disk by sliding on the disk or glide over the disk;

an arm member for holding the head;

support means for supporting the arm member via an elastic member so that the arm member can be raised or lowered;

load means for exerting a force on a first position of the arm member so as to place the head on the disk or to make the head approach the disk; and unload means for exerting a force on a second position of the arm member so as to separate the head from the disk, the second position being further separated from the head than the first position from the head.

In the second aspect of the present invention, a disk drive for recording data to and/or reproducing data from a disk comprises:

a head for writing the data into and/or reading the data out of the disk by sliding on the disk or glide over the disk;

an arm member for holding the head;

support means for supporting the arm member via an elastic member so that the arm member can be raised or lowered;

load means for exerting a first force on the arm member so as to place the head on the disk or to make the head approach the disk;

unload means for exerting a second force on a predetermined position of the arm member so as to separate the head from the disk, the predetermined position being further separated from the head than the first position form the head; and a restriction member for exerting a third force on the arm member so as to restrict a position of the arm member in a direction in which the arm member is moved to be separated from the disk.

In the third aspect of the present invention, a disk drive for recording data to and/or reproducing data from a disk comprises:

a head for writing the data into and/or reading the data out of the disk by sliding on the disk or glide over the disk;

an arm member for holding the head;

support means for supporting the arm member via an elastic member so that the arm member can be raised or lowered;

load means for exerting a force on the arm member so as to place the head on the disk or to make the head approach the disk;

unload means for exerting a force on the arm member so as to separate the head from the disk, and a cover member of the disk drive for making contact with the arm member so as to restrict a position of the arm member in a direction in which the arm member is moved to be separated from the disk.

In the fourth aspect of the present invention, a disk drive for recording data to and/or reproducing data from a disk comprises:

a head for writing the data into and/or reading the data out of the disk by sliding on the disk or glide over the disk;

an arm member for holding the head;

support means for supporting the arm member via an elastic member so that the arm member can be raised or lowered;

load means for exerting a force on a the arm member so as to place the head on the disk or to make the head approach the disk;

unload means for exerting a force on the arm member so as to separate the head from the disk, and a restriction member which makes contact with the arm member at a separate point from a point at which the head slides on or glides over the disk, so as to restrict a position of the arm member in a direction in which the arm member is moved to be separated from the disk.

The above and other objects, effects, features and advantages of the present invention will become more apparent from the following description of the embodiments thereof taken in conjunction with the accompanying drawings.

BRIEF DESCRIPTION OF THE DRAWINGS

FIG. 21 shows the lowered position or the loaded position of the heads, and FIG. 22 shows the raised position or the unloaded position of the heads;

FIG. 25 shows the lowered position or the loaded position of the heads, and FIG. 26 shows the raised position or the unloaded position of the heads;

FIG. 29 shows the lowered position or the loaded position of the heads, and FIG. 30 shows the raised position or the unloaded position of the heads;

FIG. 33 shows the lowered position or the loaded position of the heads, and FIG. 34 shows the raised position or the unloaded position of the heads;

DETAILED DESCRIPTION OF PREFERRED EMBODIMENTS

Figure 1:
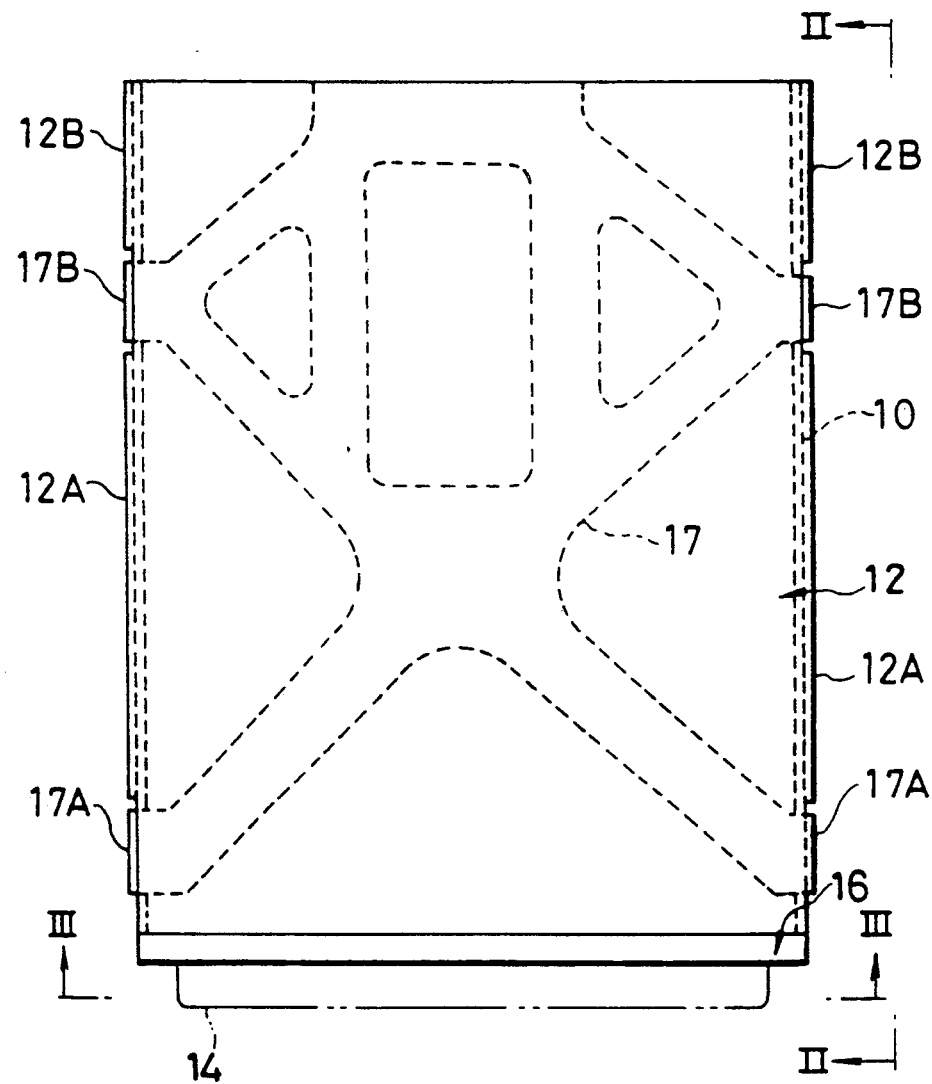
FIG. 1 is a top plan view of an embodiment of disk drive in accordance with the present invention.

The invention will now be described with reference to the accompanying drawings, in which the same reference numerals designate the same or corresponding parts. First, an example of the entire structure of a disk drive to which the present invention can be suitably applied will be described with reference to FIGS. 1-20. FIG. 1 is a top plan view of and embodiment of the disk drive, FIG. 2 is a right side view taken along the line II—II of FIG. 1, and FIG. 3 is a front view taken along the line III—III of FIG. 1.

Figure 2:
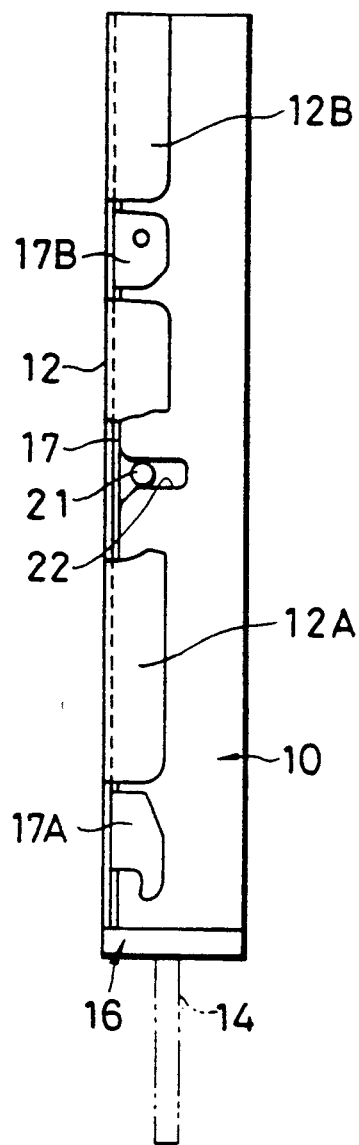
FIG. 2 is a right side view taken along the line II—II of FIG. 1.
Figure 3:
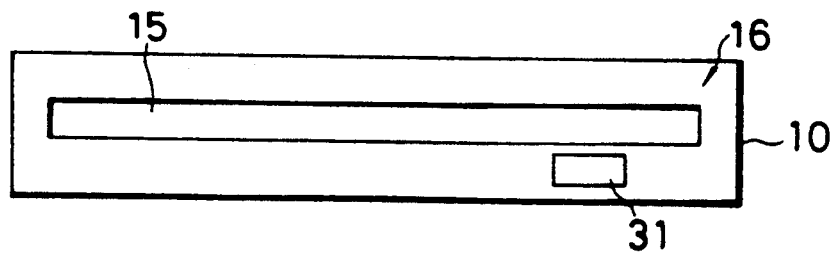
FIG. 3 is a front view taken along the line III—III of FIG. 1.

In FIGS. 1-3, a case of the disk drive is composed of a base 10 shaped like a box the top and the front of which is open, and a cover 12 and a front panel 16 which cover these openings. On the top open portion, the base 10 is provided with a reinforcing member 17 and the cover 12, which is disposed at an upper side of the reinforcing member 17. Bent portions 17A and 17B formed at both sides of the reinforcing member 17 are respectively engaged to and screwed on the side face of the base 10, so that the reinforcing member 17 is fixed to the base 10. As a result, a rigidity of the base 10 is ensured. The cover 12 is also fixed to the base 10 with its bent portions 12A and 12B being engaged to the side face of the base 10.

The base 10 and the reinforcing member 17, for example, are made of a metal plate such as aluminum. The cover 12, which functions as a shield against magnetism and dust, is made of a thin plate of nonmagnetic material such as aluminum. At the front of the base 10, there is provided a front panel 16 in which a cassette insertion aperture 15 is formed through which a disk cassette 14 is inserted or ejected.

Each of the components of the disk drive housed in the case described above will be described below.

Figure 4:
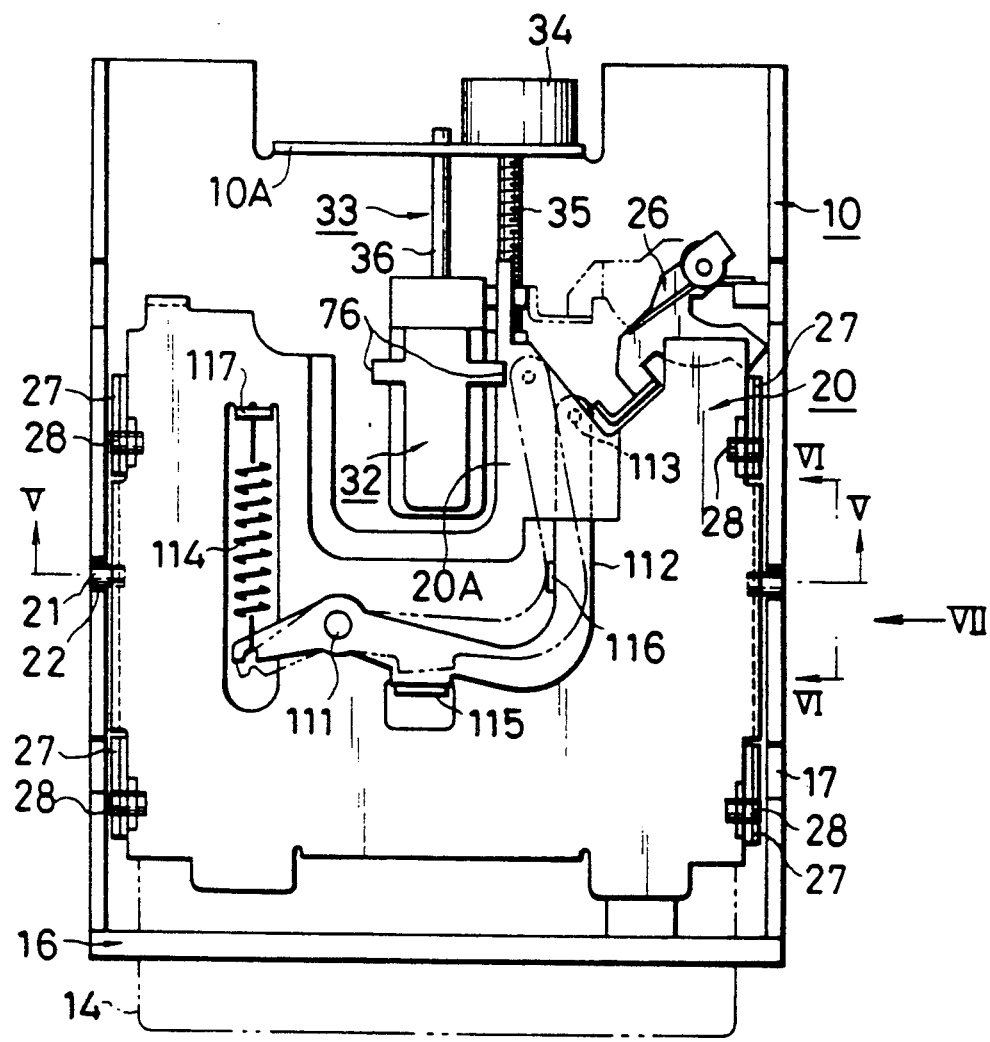
FIG. 4 is a plan view showing the disk drive of FIG. 1 with its cover removed.
Figure 5:
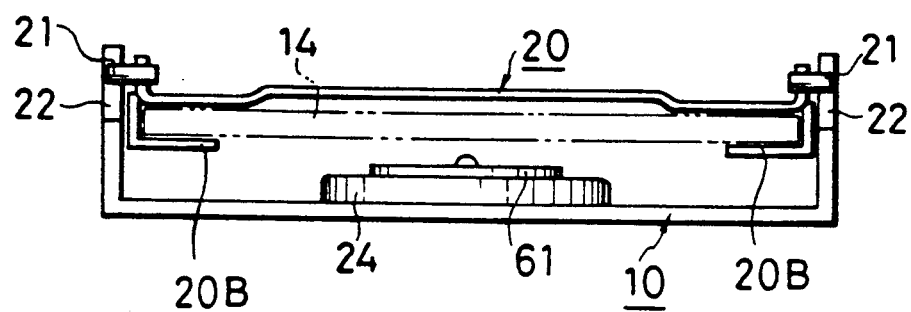
FIG. 5 is a cross sectional view taken along the line V—V of FIG. 4.
Figure 6:
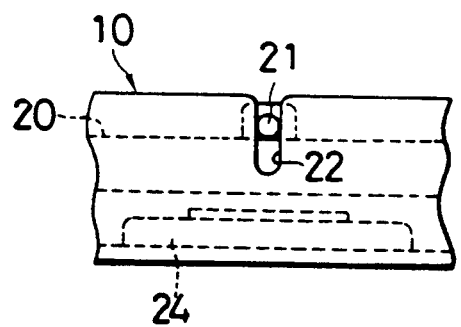
FIG. 6 is a partial side view taken along the line VI—VI of FIG. 4.

FIG. 4 is a plan view showing the disk drive with its cover 12 and reinforcing member 17 removed. FIG. 5 is a cross sectional view taken along the line V—V of FIG. 4, showing the base 10 and the cassette guide 20. FIG. 6 is a partial side view taken along the line VI—VI of FIG. 4. In FIGS. 4, 5 and 6, a cassette guide 20 is arranged to be able to be raised or lowered (in vertical directions to a plane of FIG. 4) against the base 10 so that the cassette guide 20 can guide an insertion and an ejection of the disk cassette 14 to the disk drive as well as to guide the loading and unloading of the disk cassette 14 to a motor 24.

The cassette guide 20 has a holder 20B shown in FIG. 5 to guide and hold the disk cassette 14, and has guide pins 21 on both sides thereof. The base 10, on the other hand, has, on both sides, slots 22 to which the guide pins 21 of the cassette guide 20 slidably fit, and which elongate in the direction vertical to the bottom plane of the base 10. Thus, the cassette guide 20 is attached to the base 10 in such a manner that it can move up or down along the slots 22 in a predetermined range. The cassette guide 20 has cam pins 28 at its four corners. Each of the cam pins 28 engages with a cam slot formed at each of the upright portions provided at four corners of a slide plate of FIG. 7, which will be described later. Thus, relative movement of the cassette guide 20 to the slide guide can be produced when the cassette 14 is inserted or ejected. The cassette guide 20 moves up and downs with regard to the base 10 during the relative movement.

A vertical pin 111 attached to the top surface of the cassette guide 20 rotatably pivots a shutter lever 112. The shutter lever 112, interlocking with the insertion or the ejection of the disk cassette 14, opens or closes the shutter 47 (of FIG. 10) of the head accepting openings of the disk cassette 14. On the lower side surface of an end of the shutter lever 112, is projected a shutter pin 113 to be engaged with the end edge of the shutter 47. The other end of the shutter lever 112 is pulled clockwise in FIG. 4 by a spring 114 an end of which is supported by a spring supporting portion 117 which is projected on the upper surface of the cassette guide 20. On the cassette guide 20 a stopper 115 is formed for restricting the cassette non-loading position of the shutter lever 112, and on the shutter lever 112, a stopper 116 is provided for limiting the cassette installing position at which the head accepting aperture is opened. In this arrangement, the shutter lever 112 can swing between the two positions, that is, between the cassette non-loading position shown by solid lines and the cassette loading position shown by phantom lines. Incidentally, the end of the shutter lever 112 on which the shutter pin 113 is projected is covered with a cover 20A which is formed on the cassette guide 20.

Figure 7:
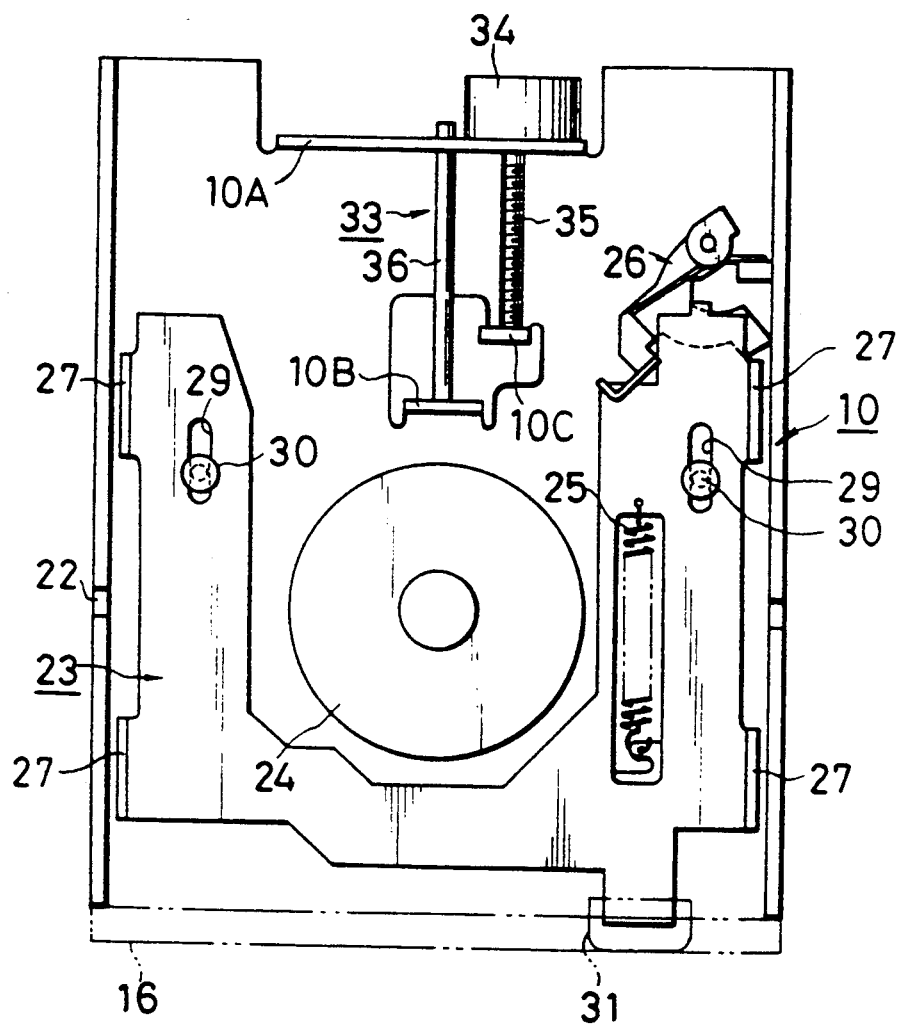
FIG. 7 is a plan view showing the disk drive of FIG. 4 with the cassette guide removed therefrom.

FIG. 7 is a plan view showing the disk drive of FIG. 4 with the cassette guide 20 removed therefrom. In FIG. 7, under the cassette guide 20, slide plate 23 is provided that has upright portions 27 is provided at four corners thereof and each of which has the cam slot described above so that the slide plate 23 restricts the lateral motion (left to right or right to left direction in FIG. 7) of the cassette guide 20 as well as raising or lowering the cassette guide 20. The slide plate 23 is mounted in the base 10 in such a manner that it can slide in the directions (back or forth direction) in which the disk cassette 14 is inserted or ejected.

Near the center of the bottom of the base 10, a disk shaped disk drive motor 24 is disposed, and the slide plate 23 has a cutout at the center thereof so as to avoid interference with the disk drive motor 24. The slide plate 23 is supported by a plurality of (four, for example) projections (not shown) formed on the base 10 to support the bottom of the slide plate, and slots 29 formed at two positions, namely, at right hand and left hand positions of the slide plate 23, are fitted to headed pins 30 attached to the base 10 so that the slide plate 23 can slide in the back or forth direction in a predetermined range with its upward movement (in the direction normal to the paper of FIG. 7) being restricted. The slide plate 23 is normally pulled forward (toward the front panel 16) by a pulling spring 25 spanning between the slide plate 23 and a member formed on the bottom of the base 10. On the other hand, the slide plate 23 can engage with a latch member 26 (which will be described later), and when latched, the slide plate 23 is held at the back position (the position as shown in FIG. 7) against the force of the pulling spring 25.

As described above, the upright portions 27 are formed at two (back end and front end) portions of each side of the slide plate 23 (total four positions thereof) to regulate the lateral position of the cassette guide 20. In the upright portions 27, cam portions (cam slots) 65 (see FIGS. 8 and 9) are formed for raising and lowering the cassette guide 20, and at the same time for specifying the position in the back and forth direction of the slide plate 23 in response to the vertical position of the cassette guide 20.

Motions of the cassette guide 20 and the slide plate 23 relative to each other, in relation to the cam slots 65, will be described with reference to FIGS. 8 and 9.

Figure 8:
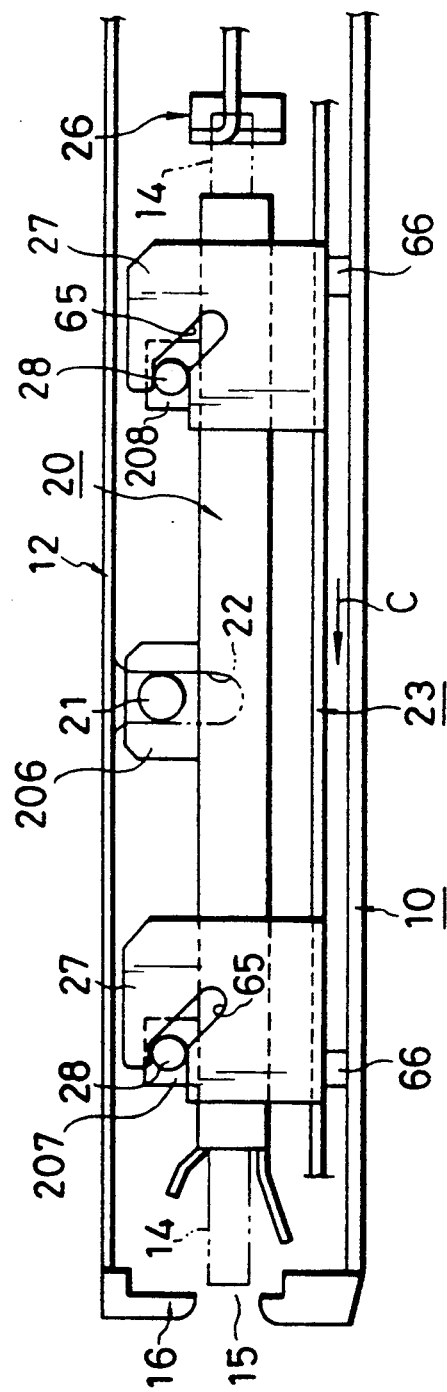
FIG. 8 is a sectional side view showing the disk drive of FIG. 4 with the cassette guide elevated.
Figure 9:
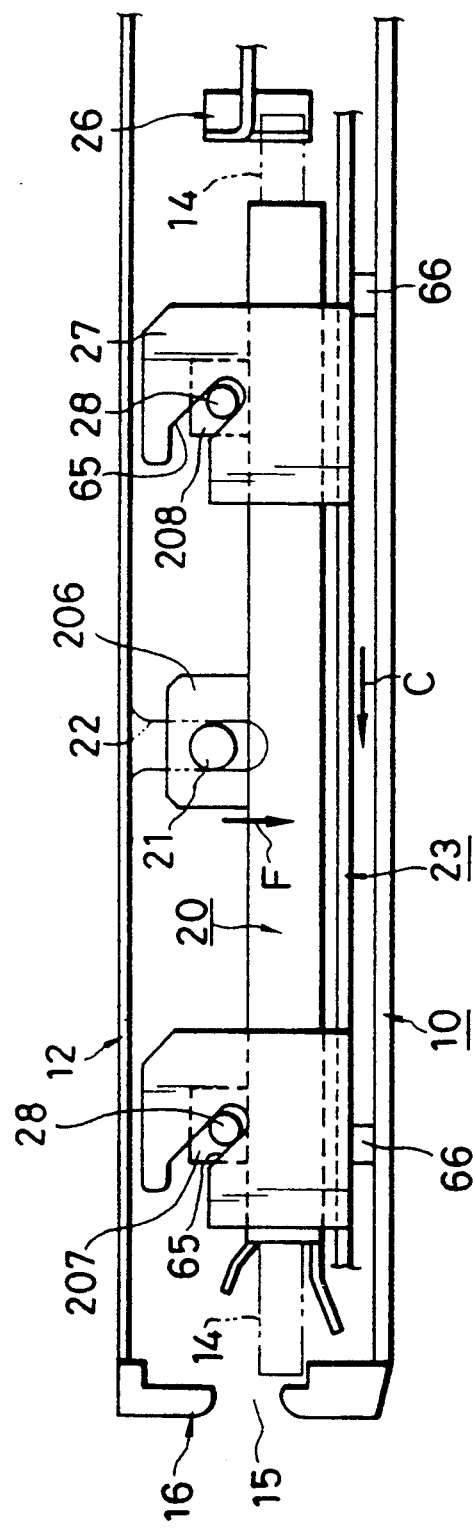
FIG. 9 is a sectional side view showing the disk drive of FIG. 4 with the cassette guide lowered.

FIGS. 8 and 9 are side views taken along the arrow VII of FIG. 4, showing the relative motion of the cassette guide 20 to the slide plate 23: FIG. 8 illustrates the raised state of the cassette guide 20 in which the disk cassette 14 is not housed or is in the course of insertion; and FIG. 9 illustrates the lowered state of the cassette guide 20 in which the disk cassette 14 is housed.

In FIGS. 8 and 9, the cam slots 65 are formed in the upright portions 27 disposed on each side of the slide plate 23. Each cam slot 65 consists of a horizontal slot portion formed at the front side (the front panel side), and a sloped slot portion extending from the horizontal slot portion to the bottom back of the upright portion 27. To each cam portion 65 a cam pin 28 (which is provided on each side of the cassette guide 20) fits. In this case, the guide pins 21, provided at the center of each side of the cassette guide 20, fit the slots 22 having a predetermined length which are formed on both sides of the base 10 and are shown by phantom lines. Thus, the cassette guide 20 can move only up and down relative to the base 10.

In the state of FIG. 8, when the disk cassette 14 is inserted through the cassette insertion aperture 15 in the front panel 16 and is pushed to v- the inner part of the disk drive, as described later with reference FIGS. 10 and 11, the latch member 26 engages the front edge of the disk cassette 14 in response to the pushing of the disk cassette 14, so that the latch member 26 turns clockwise and sets the engagement with the slide plate 23 free. As a result, the slide plate 23 is moved toward the arrow C of FIGS. 8 and 9 (toward the front panel 16) by the pulling spring 25. In accordance with this motion, each of the cam pins 28 are guided downward by each of the cam slots 65, thereby lowering the cassette guide 20 at the cassette loaded position as shown in FIG. 9. With these series of the motions, a disk housed in the disk cassette 14 is loaded on a rotor of the motor 24.

In this case, the forward stop position of the slide plate 23 (see FIG. 9) is determined by the shape of the cam slots 65 because the lowered position of the guide cassette 20 is restricted, and the cam slots 65 engage with the cam pins 28. Incidentally, reference numeral 66 in FIGS. 8 and 9 designates projections provided at a plurality of positions on the base 10 for slidably supporting the slide plate 23.

On performing ejection of the disk cassette 14, by pushing an ejection button 31 shown in FIG. 7, the slide plate 23 is pushed backward. This pushing produces a different engagement of the slide plate 23 with the latch member 26 so that the latch member 26 rotates counterclockwise, and the slide plate 23 is latched at the back position (pushed position). With the counterclockwise rotation of the latch member 26, the pushing arm thereof pushes the disk cassette 14 forward to eject it.

Referring to FIGS. 4 and 7 again, a head seek means (a head moving means) 33 is provided in the base 10. The head seek means 33 is a mechanism for moving a head unit 32 shown in (FIG. 4), which includes recording and reproducing heads, in the radial direction of the disk which is loaded and positioned on the drive motor 24 so that the heads are placed on a desired track. The head leading means for loading or unloading the head to the disk as described later, is provided in the head unit 32. The head seek means 33 is composed of the driving motor (a stepper motor, for example) 34, a lead screw 35 for converting the rotational movement of the motor 34 to the radial movement of the head unit 32, a guide bar 36 for correctly guiding the radial movement of the head unit 32, etc. The lead screw 35 and the guided bar 36 are supported by upright portions 10A, 10B and 10C formed by cutting the bottom plate of the base 10. Incidentally, FIG. 7 illustrates a state where the head unit 32 is removed.

Figure 10:
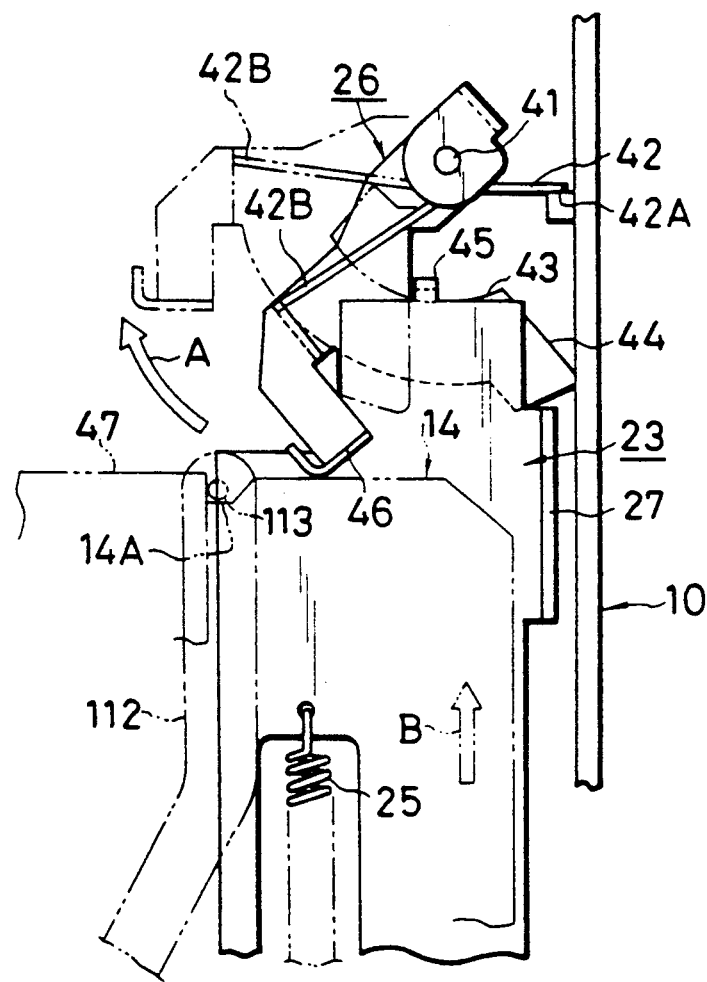
FIGS. 10 and 11 are partial plan views respectively showing a latch state and a non-latch state of the latch member of FIG. 4.

FIG. 10 is partial plan view showing the major portion of the latch mechanism in the non-loaded state of a disk cassette, or in the latched state in which the latch member 26 is in engagement with the slide plate 23. FIG. 11 is partial plan view showing the same portion as in FIG. 10 in the loaded state of the cassette disk, or in the non-latched state in which the slide plate 23 is released. FIG. 12 is a side view of the portion shown in FIG. 11. The motion of the slide plate 23 and the latch member 26 will be described with reference to FIGS. 10-12.

The latch member 26 is rotatably mounted on a vertical pin 41 attached to the bottom of the base 10, and is normally pressed counterclockwise in FIG. 10 by an ejector spring 42. The ejector spring 42 is fixed at its one end 42A to a fixed member provided on a side surface of the base 10, and at its other end 42B to a predetermined portion of the latch member 26 in such a manner that the spring 42 winds around the pin 41. Thus, the pressing force acts on the latch member 26. The latch member 26 has a curved engaging edge 43 and a sliding edge (stopper edge) 44 that turns in an approximately longitudinal direction (back-and-forth direction in FIG. 11) in the non-latched state. In the latched state shown in FIG. 10, an engaging portion (a downward portion) 45 formed on the slide plate 23 fits at the engaging edge 43, and hence the slide plate 23 is held at the back position against the force of the pulling spring 25. The latch member 26 is further provided with an ejection arm 46 that makes contact with the front portion of the disk cassette 14. The ejection arm 46 functions, when ejecting the cassette 14, as an ejector for expelling the disk cassette 14 with the force produced by the ejector spring 42.

When the disk cassette 14 is inserted in the latched state as shown in FIG. 10 (in the direction of the arrow B), the front portion of the cassette 14 makes contact with the ejection arm 46 so that as the cassette is further inserted, the latch member 26 rotates in the direction of the arrow A against the force of the ejection spring 42, and thus, the engaging edge 43 of the latch member 26 slips out of the engaging portion 45 of the slide plate 23 and engages the sliding edge 44. Thus, the slide plate 23 moves in the direction of the arrow C with the force of the pulling spring 25, thereby resulting in the cassette loaded state or non-latched state as shown in FIG. 11. In this state, the rotational position of the latch member 26 is held by the engagement of the engaging portion 45 with the sliding edge 44.

With the insertion of the disk cassette 14, the shutter 47 of the disk cassette 14 is simultaneously opened. More specifically, when the disk cassette 14 is inserted, a shutter pin 113 on the shutter lever 112 fits on the edge of the shutter 47 as well as fits a slide portion 14A formed at the front edge of the disk cassette 14 (as shown in FIG. 10). As the disk cassette 14 further advances, with this advance, the shutter pin 113 slides left on the slide portion 14A while pushing the shutter 47. In accordance with this slide, the shutter lever 112 rotates counterclockwise, and hence the shutter 47 begins to open against the force of the spring which is provided in the disk cassette 14. Thus, when the cassette is placed at the loaded position as shown in FIG. 11, the head accepting aperture is entirely open. Once the head accepting aperture is open, the head loading becomes possible as will be described later: the heads in the head unit 32 are pressed (or placed close) to the disk so that a writing of data into or reading of data out of the disk becomes possible.

On the other hand, when the disk cassette is to be ejected, the eject button 31 in FIG. 7 is depressed so that the slide plate 23 is pushed into the direction of the arrow D of FIG. 9. As a result, the engaging portion 45 separates from the sliding edge 44 of the latch member 26 and engages the engaging edge 43. Thus, the latch member 26 is turned by the force of the ejector spring 42 in the direction of the arrow E in FIG. 11, and hence the disk cassette 14 is ejected forward by the advancing force of the pushing arm 46 of the latch member 26. In this case, the shutter 47 of the disk cassette 14 separates from the shutter lever 112 in accordance with the ejection of the cassette, and automatically returns to its normal position with the force of the spring so as to close the head accepting aperture. At the same time, the engaging edge 43 of the latch member 26 fits on the engaging portion 45 of the slide plate 23 so that the slide plate 23 is held at the back position. Accordingly, as shown in FIG. 8, the cassette guide 20 is maintained at the raised position, and one of the heads is also held at the elevated position (the unloaded position) with the cassette guide 20 as described later with reference to FIG. 18.

Figure 11:
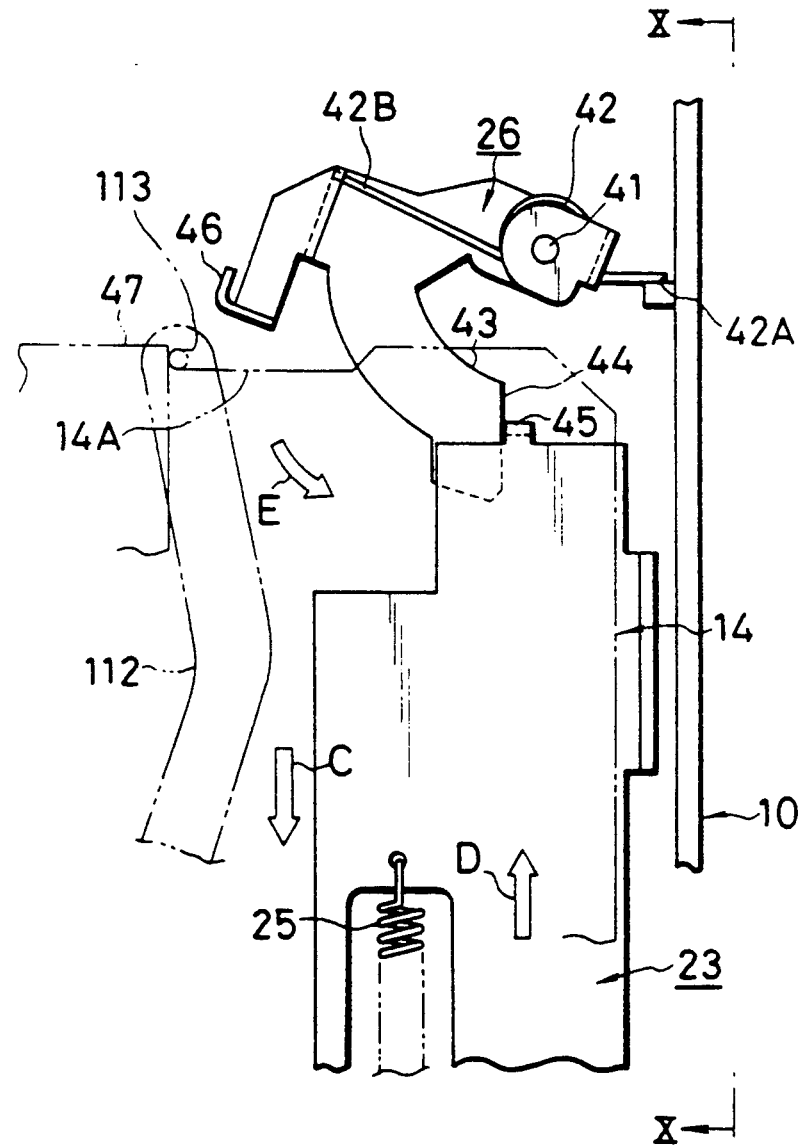
Figure 12:
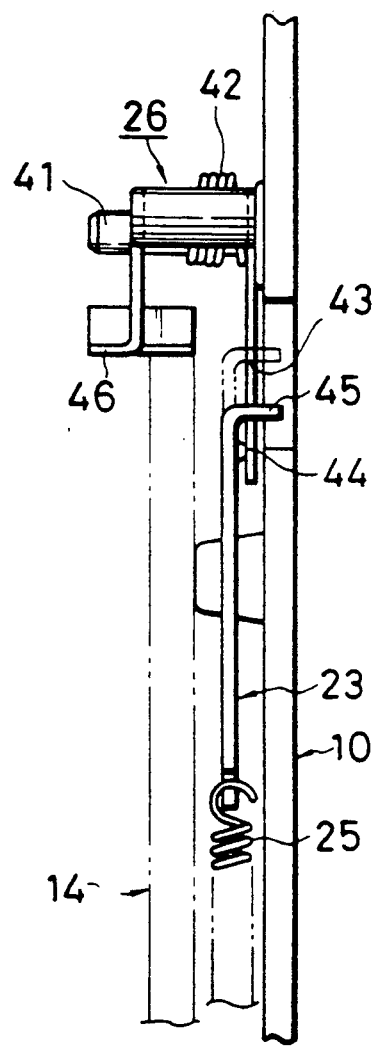
FIG. 12 is a side view taken along the line X—X of FIG. 11.
Figure 13:
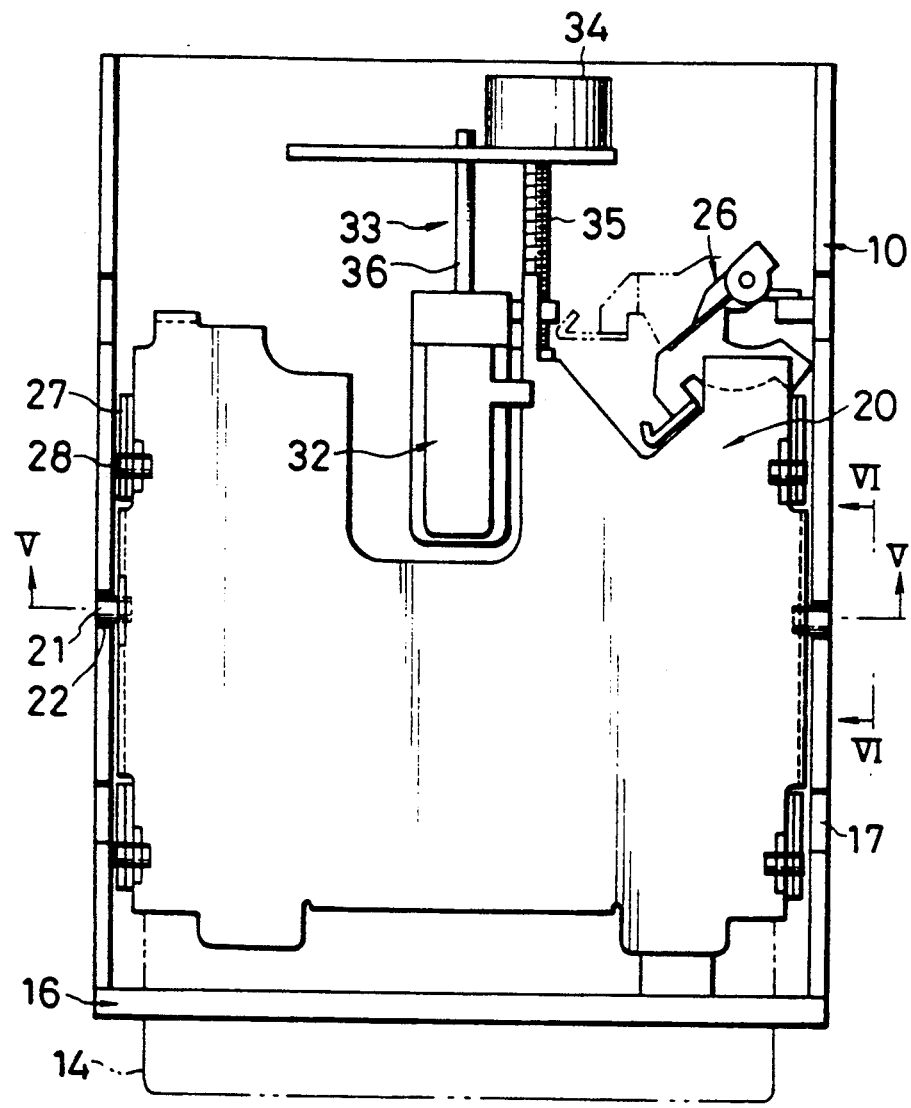
FIG. 13 is a plan view showing the disk drive of another embodiment of the present invention with its cover removed.
Figure 14:
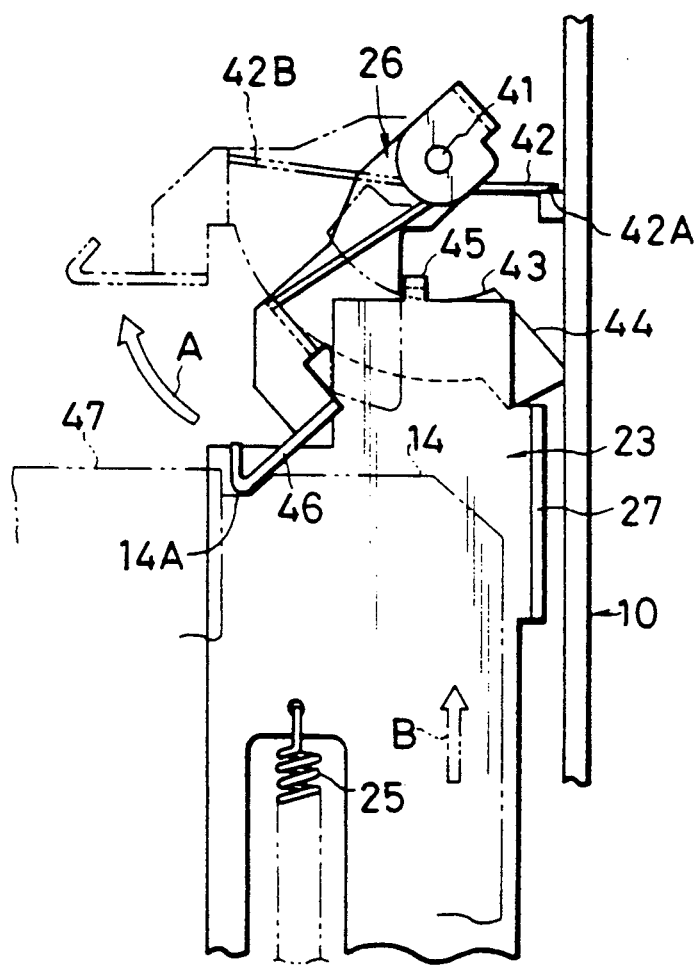
FIGS. 14 and 15 are partial plan views respectively showing the latch state and the non-latch state of the latch member of FIG. 13.
Figure 15:
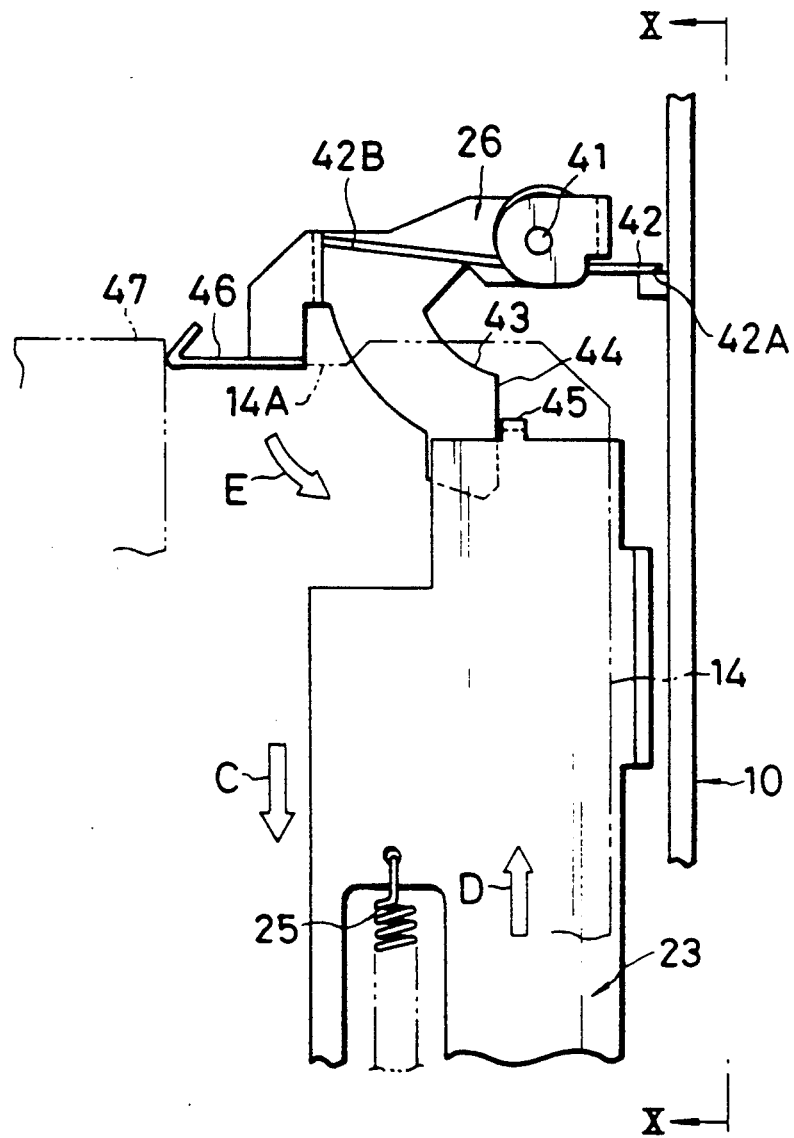

FIGS. 13, 14 and 15 are views for explaining another arrangement for opening and closing the shutter 47 of the disk cassette 14, which correspond to FIGS. 4, 10 and 11, respectively.

This arrangement excludes the shutter lever 112 and the components associated therewith as shown in FIG. 13. More specifically, when the disk cassette 14 is inserted, the ejection arm 46 of the latch member 26 directly engages the slide portion 14A of the disk cassette 14. As the disk cassette 14 is further pressed forward in the direction indicated by the arrow B in FIG. 14, the latch member 26, rotating in the direction indicated by the arrow A in FIG. 14, slides on the sliding portion 14A, thereby opening the shutter 47. The rotation of the latch member 26 terminates when the engaging portion 45 of the slide plate 23 releases the engagement with the engaging edge 43 of the latch member 26, and then fits to the slide edge 44. As a result, the shutter 47 is kept open as shown in FIG. 15.

Figure 16:
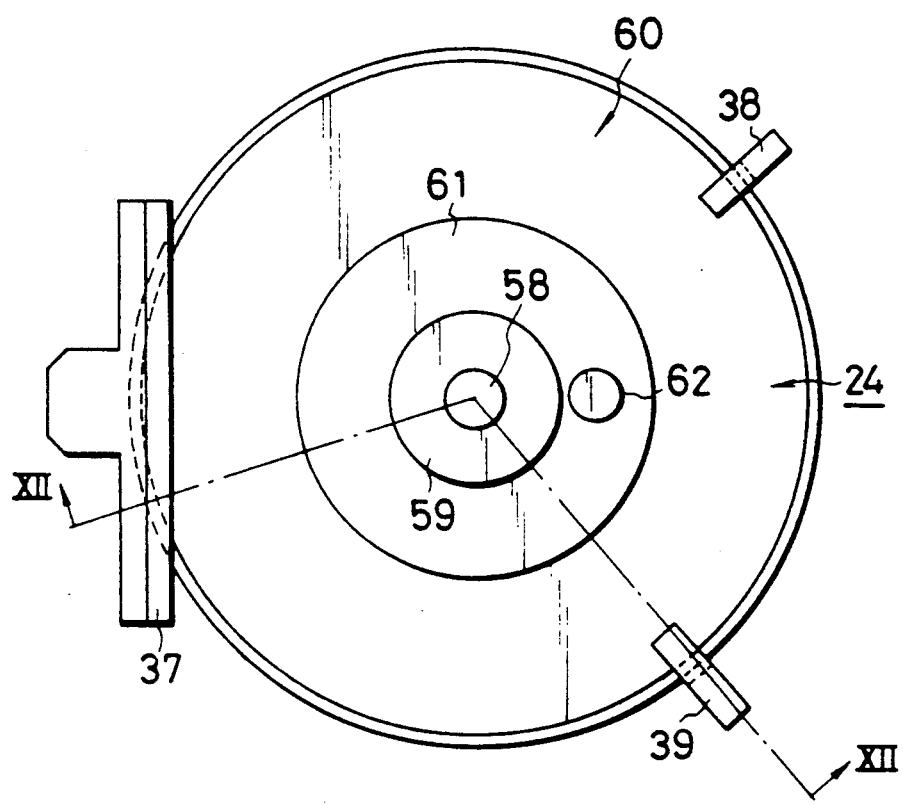
FIG. 16 is a plan view showing the motor of FIG. 7 for driving the disk.
Figure 17:
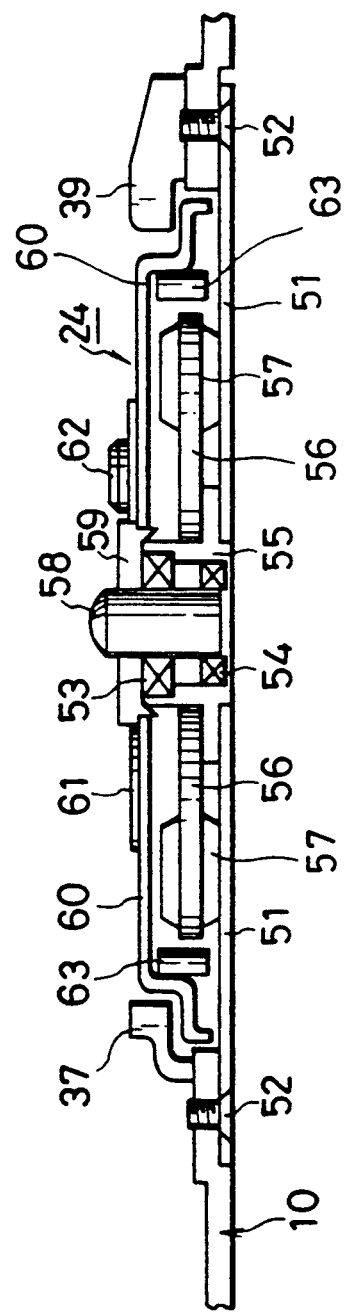
FIG. 17 is a longitudinal sectional view of the motor taken along the line XII—XII of FIG. 16.

FIG. 16 is a plan view showing the motor 24 for driving the disk (the recording medium) in the disk cassette 14, and FIG. 17 is a longitudinal sectional view of the motor taken along the line XII—XII of FIG. 16. As the disk drive motor 24, a flat motor of circumference facing outer rotor type is used, and the motor 24 is mounted on the bottom of the base 10.

In FIGS. 16 and 17, a stator yoke 51 is fixed to the bottom of the base 10 with screws 52. On the stator yoke 51, are mounted stator side component parts such as a bearing housing 55 that holds bearings 53 and 54, a stator 56, a coil 57, etc. The bearings 53 and 54 support a spindle shaft 58. On the spindle shaft 58 are mounted rotor side component parts such as a disk-like outer rotor 60 which is mounted on the shaft via a flange 59, an attracting magnet 61 for fixing the disk on the rotor, a disk drive pin 62 on the attracting magnet 61, drive magnets 63 fixed inside the rotor 60 so as to face the stator 56.

Furthermore, on the bottom of the base 10, stoppers 37, 38 and 39 for preventing the rotor from moving upward along the shaft are fastened with screws or the like. The stoppers 37, 38 and 39 also serve to prevent the bottom surface of the disk cassette 14 from contacting the rotor 60 owing to the warp of the bottom surface in the disk cassette loaded state. Alternatively, the stoppers 37, 38 and 39 can be formed on the base 10 in one body (integral) with the base. In the loaded state of the disk cassette 14, the magnetic body (not shown) provided at the center of the disk is attracted to the attracting magnet 61, and the index hole (not shown) of the disk is fitted into the drive pin 62 so that the disk (the recording medium) is correctly positioned with regard to the rotor 60.

Figure 18:
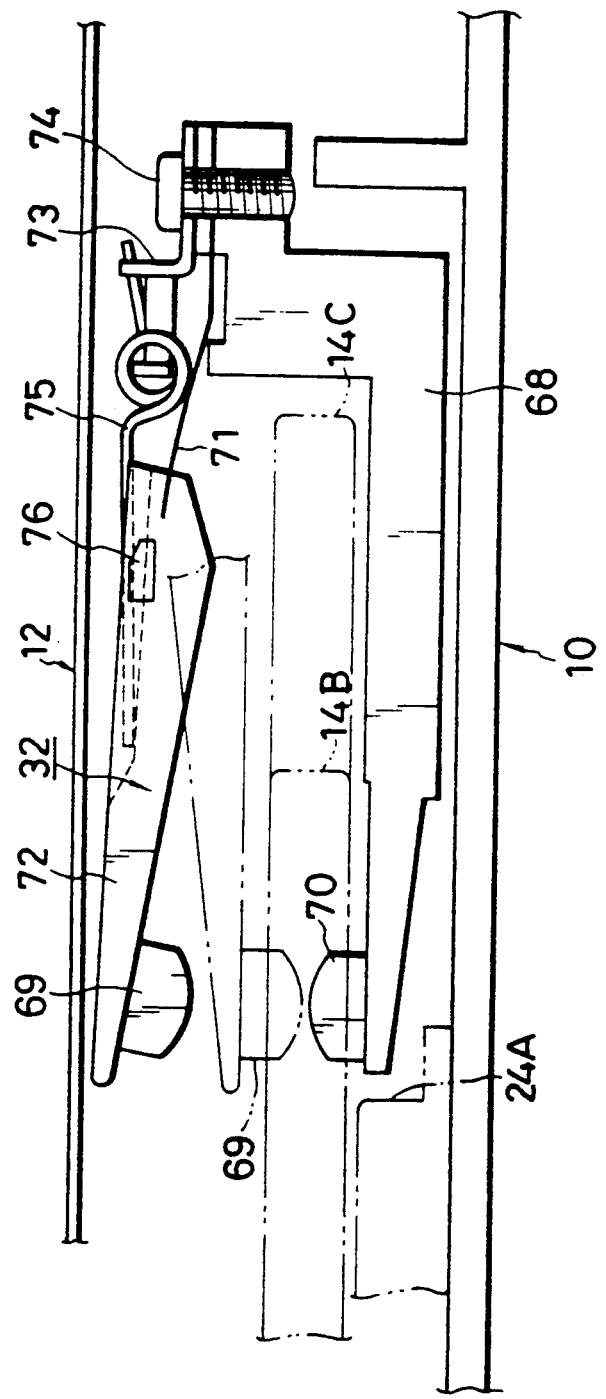
FIG. 18 is a side view showing the construction of the head unit of FIG. 4.

FIG. 18 is a side view showing the construction of the head unit 32 (see FIG. 4 or FIG. 13). In FIG. 18, the head unit 32 is arranged in such a manner that various component parts of the head unit 32 are mounted on a carriage 68. In addition, on the carriage 68, there are provided an upper head 69 that performs writing of data into and reading of data from the upper tracks of the disk, and a lower head 70 that performs writing of data into and reading of data from the lower tracks of the disk. The head unit 32 (or the carriage 68) extends in the radial direction of the disk by a predetermined length so that the heads 69 and 70 can achieve writing of data into and reading of data from the tracks. The lower head 70 is attached on the front end portion of the carriage 68.

On the other hand, the upper head 69 is arranged so as to be raised or lowered with regard to the carriage 68. More specifically, the upper head 69 is attached to a head arm 72 to the backend portion of which leaf springs 71 are attached. An end of each leaf spring 71 is fixed to the carriage 68 together with a supporting member 73 with a attaching screw 74. With these arrangements, the carriage 68 can support the head arm 72 via the leaf springs 71 in such a manner that the head arm 72 can move up or down. To the supporting member 73, is attached a head loading spring 75 that sets the head 69 in the loaded state by forcing the head arm 72 downward to the disk so that the head 69 makes contact with or approaches the disk to make the writing or reading possible. At a side or both sides of the head arm 72, there is provided a lifter or lifters 76 which engage the cover 20A (shown in FIG. 4) on the cassette guide 20. With this arrangement, when the cassette guide 20 is raised, the head arm 72 is also raised, and thus the head 69 is raised (i.e., unloaded). In the example shown in FIG. 18, the head arm 72 is supported by the leaf springs 71 of a considerable length in such a manner that the head arm 72 can move up and down, and the lifter 76 is placed closer to the leaf springs 71 than to the point of action of the head loading spring 75. Thus, a moment of force is produced in such a way that the head arm 72 is forced to lower its front end (counterclockwise in FIG. 18) in the course of head raising (during unloading of the head). As a result, the front end of the head arm 72 is lowered by the bending action of the leaf springs 71 so that the top position of the head arm 72 is lowered.

Incidentally, the phantom lines 14A and 14B in FIG. 18 represent the relative positions of the disk cassette 14 to the head unit 32. The phantom lines 24A indicate the relative position of the disk drive motor 24 to the head unit 32 when the head unit 32 advances to the innermost depth. The seek operation of the head unit 32 is carried out by moving the carriage 68 in the radial direction of the disk with the motor 34.

Figure 19:
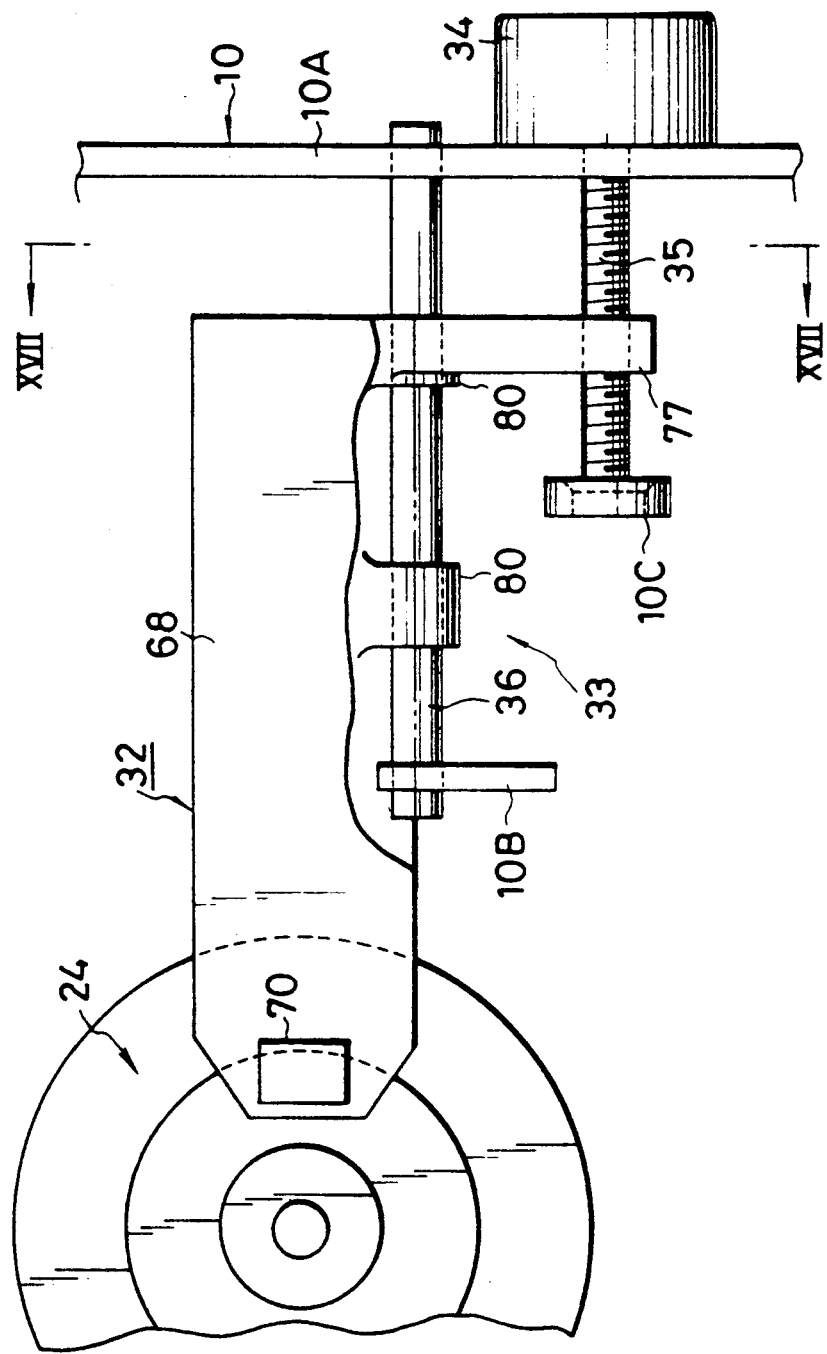
FIG. 19 is a partial plan view showing a relationship between the head unit and the head seek mechanism.
Figure 20:
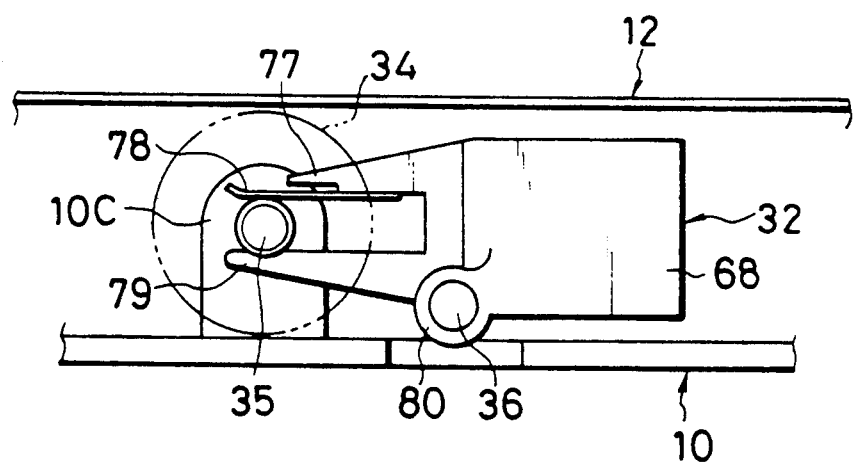
FIG. 20 is a transverse sectional view taken along the line XVII—XVII of FIG. 19.

FIG. 19 is a partial plan view showing a relationship between the head unit 32 and the head seek means 33 with the head arm 72 and the upper head 69 in FIG. 18 removed, and FIG. 20 is a transverse sectional view taken along the line XVII—XVII of FIG. 19. In FIGS. 19 and 20, the head seek motor (a stepper motor, for example) 34 is mounted on a upright plate 10A on the base 10, and the output shaft thereof, namely, a screw shaft 35 is rotatably supported at the ends thereof by the upright plate 10A and an upright plate 10C. In addition, a guide bar 36, which guides the carriage 68 during the seek operation, is supported at the ends thereof in the radial direction by the upright plate 10A and another upright plate 10B.

As shown FIG. 20, under a projection 77 of the carriage 68, a leaf spring 78 is attached in such a manner that it is pressed to the screw shaft 35. To the carriage 68, is fastened a needle pin 79 that extends in lateral direction, and fits in a screw thread under the screw shaft 35. On two positions of the carriage 68, are provided bearings 80 which slidably fit the guide bar 36 so that the carriage 68 can move along the guide bar 36.

With these arrangement, when the screw shaft 35 is rotated by the motor 34, the head unit 32 and the carriage 68 move in the radial direction of the disk via the needle pin 79, thereby performing the seek operation so as to place the heads 69 and 70 on the desired tracks. Next, some embodiments of arrangement for reducing the thickness of the disk drive explained above will be described.

EMBODIMENT 1

Figure 21:
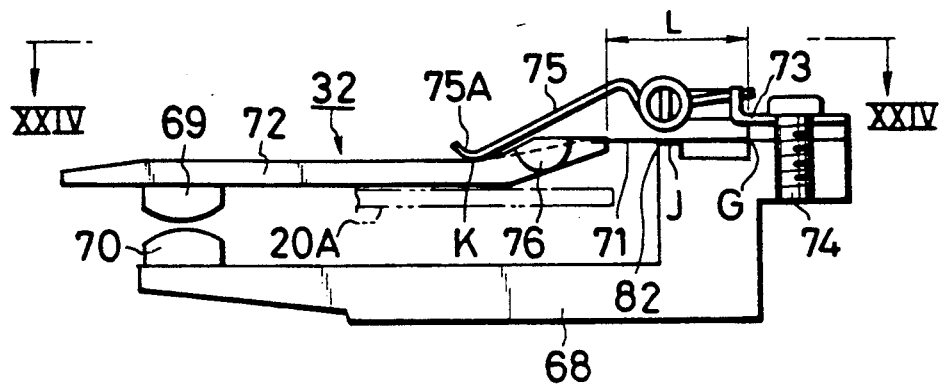
FIGS. 21 and 22 are partial side views showing a major arrangement of a first embodiment of the disk drive of the present invention.
Figure 22:
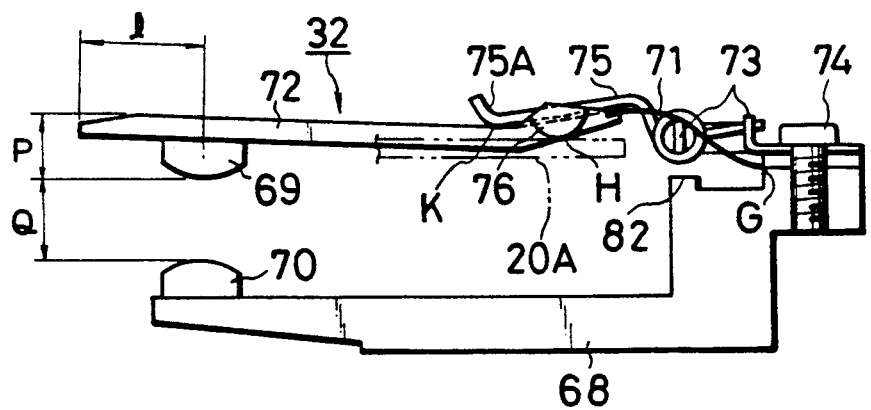
Figure 23:
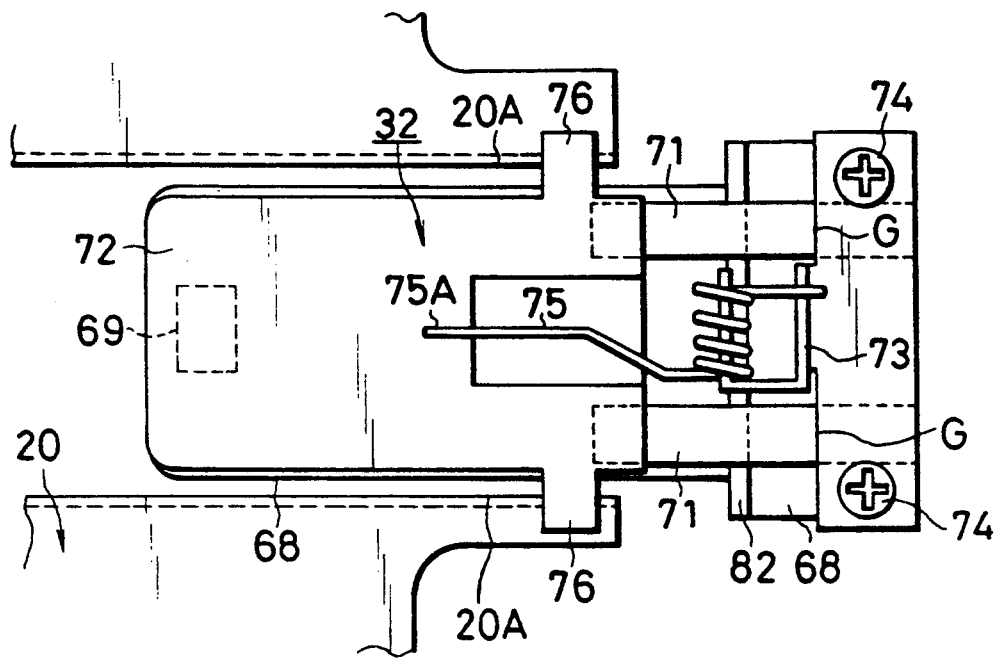
FIG. 23 is a plan view taken along the line XXIV—XXIV of FIG. 21.

FIGS. 21 and 22 are partial side views showing a major arrangement of a first embodiment of the disk drive of the present invention: FIG. 21 shows the lowered position or the loaded position of the heads; and FIG. 22 shows the raised position or the unloaded position of the heads. FIG. 23 is a plan view taken along the line XXIV—XXIV of FIG. 21.

In FIGS. 21-23, the head arm 72 is mounted on the carriage 68, which is guided and supported by the head seek means 33 (FIG. 19), via two leaf springs 71 so that the head arm 72 can be raised or lowered, and the upper head 69 is attached to the front end of the head arm 72. The upper head 69 performs writing of data into or reading of data from the upper surface tracks of the disk. The lower head 70 which performs writing of data into to or reading of data from the under surface tracks of the disk is mounted on the front end of the carriage 68 itself.

The ends of each leaf spring 71 are fixed to the carriage 68 and to the head arm 72, and the length L (see FIG. 21) of the spring portion is set at a relatively long length, e.g., $\frac{1}{2}$-$\frac{1}{4}$ of the length between a fulcrum G of the leaf springs 71 and the head 69. Although in this embodiment, the leaf springs 71 consist of two springs on both sides of the head arm 72 as shown in FIG. 23, the number of springs may be one, or three or more. The fixed ends of the leaf springs 71 at the side of the carriage 68 function as the fulcrum G of the raising and lowering portion composed of the leaf springs 71 and the head arm 72.

The lifter 76, which can contact with the top surface of the cover 20A of the cassette guide 20, is formed on each side of the arm 72 at positions close to the leaf springs 71. The lifter 76 is a point at which the upward force acts when the cassette guide 20 is raised, that is, a portion which functions as the point H for raising or lowering the arm 72. Incidentally, the point H can be provided at only one side.

To the supporting member 73 fixed to the carriage 68, is attached the head loading spring 75 (in the example shown in FIG. 23, a coil spring) for forcing the arm 72 downward. The supporting member 73 and the leaf springs 71 are fixed on the carriage 68 with two fastening screws 74.

The head loading spring 75 presses the upper surface of the arm 72 downward with a tip 75A thereof, and the contact point of the tip 75A and the arm 72 forms a load point K of the arm 72. Thus, the load point K is positioned closer to the head 69 than the point H for raising or lowering the arm.

On the carriage 68, there is further provided a projection (stopper) 82 that makes contact with the under surface of the leaf springs 71 in the head loaded state as shown FIG. 21. This projection 82 functions as a stopper for preventing the leaf springs 71 from deflecting downward in the head loaded state in which the cassette guide 20 is lowered so that the cover 20A separates from the arm 72, and the arm 72 is lowered by the force of the spring 75. The contact point (stop point) J of the stopper 82 with the leaf springs 71 is usually selected so that the point J is located at about the center of length L of the leaf springs 71.

The leaf springs 71 can be formed from various elastic materials such as metals, plastics as long as they can elastically deform in the thickness (top to bottom) direction. In addition, the leaf springs 71 can be replaced by a elasticity portion of the arm 72 (as a thin thickness portion, for example).

The disk drive as the first embodiment of the present invention is constructed as described above. In short, the disk drive, in which the arm (72) having the head (69) is supported by the elastic member or the elastic portion, and the stopper 82 for preventing the elastic member or the elastic portion (71) from warping downward is provided below the elastic member or elastic portion, is provided.

Figure 24:
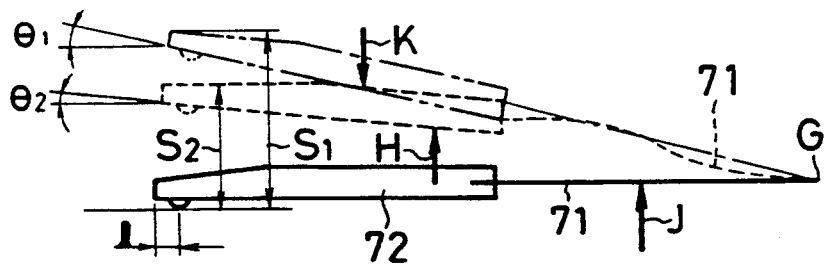
FIG. 24 is a schematic diagram for explaining the raising and lowering operation of the head with an arm and a leaf spring shown in FIG. 21.

FIG. 24 is a schematic diagram for explaining the raising and lowering operation of the head with the head unit 32 explained in FIGS. 21-23.

In FIG. 24, solid lines indicate the lowered state of the arm 72 (FIG. 21), and broken lines represent the raised state of the arm 72 (FIG. 22) of this embodiment, and phantom lines (alternate long and two short dashed line) indicate the raised state of the arm of a conventional unit head. In the conventional head unit, a head supporting member corresponding to the arm 72 and the leaf springs 71 incline approximately linearly (slope angle $\theta 1$) about the fulcrum G in the raised state.

In contrast with this, in this embodiment, when the arm 72 is in the raised position (the unloaded state of the head), the pressing point (load point) K of the head loading spring 75 is set closer to the head 69 than the point H that functions as an acting point of the raising force by the cassette guide 20 as shown in FIG. 22 and FIG. 23 (as the broken line). Thus, a moment which is produced by the forces acting at the points K and H acts on the arm 72 in the counterclockwise direction. Consequently, the leaf spring 71 is curved in such a manner that the front end portion thereof becomes horizontal, which is called a head-bending state. As a result, the arm 72 also curves so as to assume a head-bending fashion, thus approaching a horizontal line, reducing the slope angle from the conventional angle of $\theta 1$ to $\theta 2$. The highest position of the arm 72 (in the example of FIG. 24, the highest position of the head unit 32 with the lowered position of the head 69 as a reference) is reduced from a conventional height of S1 to S2.

The relationship between the highest position S of the arm 72 and the slope angle $\theta$ can be expressed by the following equation:

$$S = l \tan\theta + P$$

where l (see FIG. 24) is the distance from the head 69 to the tip of the arm 72; and P (see FIG. 22) is the total thickness of the head 69 and the arm 72. Here, since l and P are invariable, the smaller the slope angle $\theta$ of the arm 72, the smaller the highest position S of the head unit 32. In addition, the slope angle $\theta$ of the arm 72 can be brought near the horizon more easily as the length L of the leaf spring 71 increases. Thus, the head-bending effect can be increased.

According to the first embodiment described above, the highest position S of the arm 72, that is, the highest position of the head unit 32 can be reduced by employing the construction in which the head 69 is mounted on the arm 72 supported through the intermediary of the leaf spring 71. This is because the load point (the pressure point) K of the head loading spring 75 is set closer to the head 69 than the point H on which the head raising force acts is to the head 69, and hence the greater head-bending effect can be provided to the leaf springs 71 when the head 69 is raised (unloaded state) about the fulcrum G.

As a result, a margin is provided between the arm 72 and the cover 12 of the apparatus so that the height (thickness) of the apparatus can be reduced by that margin, enabling the disk drive to be thinner. In addition, since the stopper 82 for preventing the leaf springs 71 from warping downward is provided below the leaf springs 71, contact or friction between the leaf springs 71 and the disk cassette 14 during the head lowering (the head loading) operation can be positively prevented even when the length of the leaf springs 71 is set to be large. Moreover, degree of freedom of design will increase in such a way that the leaf springs 71 are made thin so as to eliminate the residual stress after warping.

EMBODIMENT 2

Figure 25:
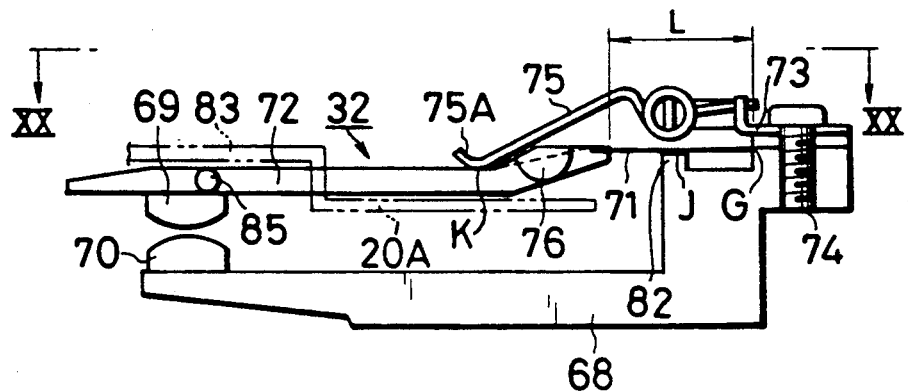
FIGS. 25 and 26 are partial side views showing a major arrangement of a second embodiment of the disk drive of the present invention.
Figure 26:
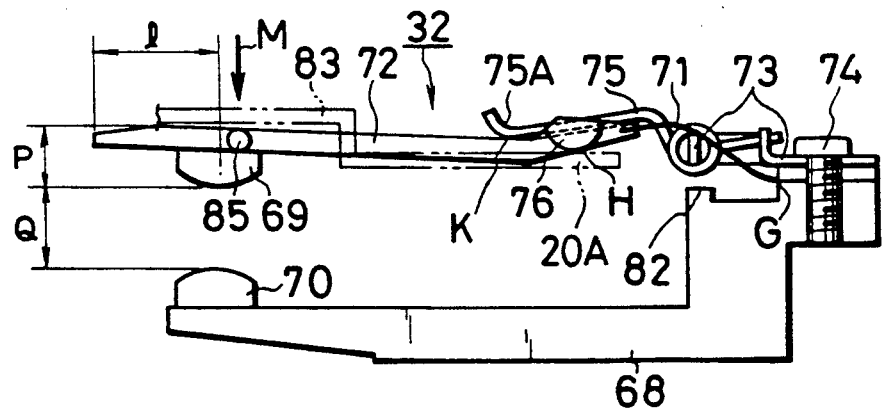
Figure 27:
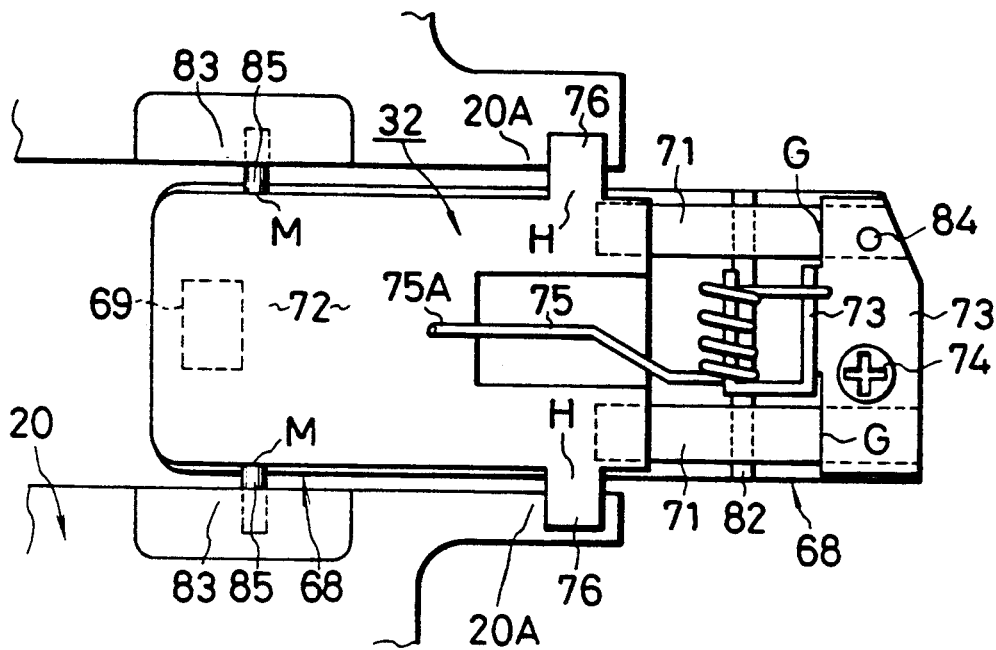
FIG. 27 is a plan view taken along the line XX—XX of FIG. 25.

FIGS. 25 and 26 are partial side views showing a major arrangement of a second embodiment of the disk drive of the present invention: FIG. 25 shows the lowered position or the loaded position of the heads; and FIG. 26 shows the raised position or the unloaded position of the heads. FIG. 27 is a plan view taken along the line XX—XX of FIG. 25.

The second embodiment differs from the first embodiment in the following:

(1) Stoppers 83 and stop pins 85 are provided

More specifically, the cassette guide 20 has, in addition to the cover 20A, stopper portions 83 for restricting the upper limit position of the arm 72. At predetermined positions on both sides of the arm 72 (in the example shown in FIG. 27, near the head 69 in the longitudinal direction of the arm), stop pins 85 are provided in such a manner that the pins can make contact with the stopper portions 83. The positions of the stop pins 85, that is, the positions (stop point) M at which the pins make contact with the arm 72 to restrict the upper limit of the arm, are set at a position closer to the head 69 than the point H for raising and lowering the arm is to the head. In FIG. 26, the stop points M are positioned closer to the head than the load point K is to the head (about the same position to that of the head 69) so that the points M, K and H are aligned in this order. The stop point M, however, may exchange its position with the load point K so that the stop points M are positioned farther from the head 69 than the load point K is from the head 69 as long as the stop points M are located closer to the head than the raising point H is to the head. In this case, the points K, M and H are aligned in this order.

(2) A stop means 84 (see FIG. 27) for stopping the rotation of the supporting member 73 is provided To fix the supporting member 73 and the leaf springs 71 on the carriage 68, they are fixed with a fastening screw 74 and a stop means 84 for stopping the rotation of the supporting member 73.

The disk drive as the second embodiment of the present invention is constructed as described above. In short, the disk drive, in which the head (69) is attached to the arm (72) supported by the elastic member or elastic portion (leaf springs) (71) in such a manner that the arm can be raised or lowered, and in which the stoppers (83) for restricting the upper limit of the arm (72) are provided on the cassette guide (20) for raising and lowering the arm (72), is provided.

Furthermore, the stoppers 83 are arranged so that they can make contact, when the head is raised, with the arm 72 at the stop points M positioned closer to the head 69 than the point H for raising and lowering the arm 72 is to the head.

Figure 28:
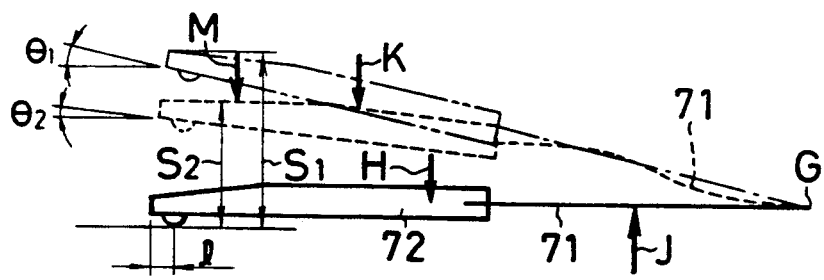
FIG. 28 is a schematic diagram for explaining the raising and lowering operation of the head with the arm and the leaf spring shown in FIG. 25.

FIG. 28 is a schematic diagram for explaining the raising and lowering motion of the head with the head unit 32 explained in FIGS. 25-27.

In FIG. 28, solid lines indicate the lowered state of the arm 72 (FIG. 25), and broken lines represent the raised state of the arm 72 (FIG. 26) of this embodiment, and phantom lines (alternate long and two short dashes line) indicate the raised state of the arm of a conventional unit head.

FIG. 28 differs from FIG. 24 in that the stop point M for limiting the upper limit position of the arm 72 is added in FIG. 28. Because the stoppers 83 for limiting the upper limit of the arm 72 are provided in addition to the head loading spring 75, the moment in the counterclockwise direction which is produced by the forces acting at the points K, H and M, is greater than that of the first embodiment, so that the upper limit position of the arm 72 can be more positively restricted.

In this case, since the stoppers 83 can be disposed on the cassette guide 20, a stopper means of simple construction can be formed without increasing the number of parts. Moreover, the contact points (the stop points) M of the stoppers 83 are positioned closer to the head 69 than the point H for raising or lowering the arm 72 is to the head 69. This will serve to further improve the head-bending effect with the head loading spring 75, thereby making it easier for the arm 72 to approach the horizon when the head is raised.

According to the second embodiment described above, the highest position S of the arm 72, that is, the highest position of the head unit 32 can be reduced by employing the construction in which the head 69 is mounted on the arm 72 supported through the intermediary of the leaf spring 71. This is because the load point (the pressure point) K of the head loading spring 75 is set closer to the head 69 than the point H on which the head raising force acts is to the head 69, and hence the greater head-bending effect can be provided to the leaf springs 71 when the head 69 is raised (unloaded state) about the fulcrum G.

As a result, the second embodiment can achieve effects similar to those of the first embodiment.

Furthermore, since the stoppers 83 are provided on the cassette guide 20 for raising and lowering the arm 72 in such a manner that the stoppers are disposed closer to the head 69 than the point H for raising and lowering the arm 72 is to the head 69, the highest position of the arm 72 is positively restricted, and the maximum height S of the arm 72 can be further reduced by further improving the head-bending effect of the leaf spring 71.

Incidentally, the stop pins 85 can be replaced with rotatable members such as rollers so as to reduce sliding resistance between the stop pins 85 and the stoppers 83. Furthermore, the restriction force with the stoppers 83 may be displaced by a non-contact force, for example, a magnetic force.

EMBODIMENT 3

Figure 29:
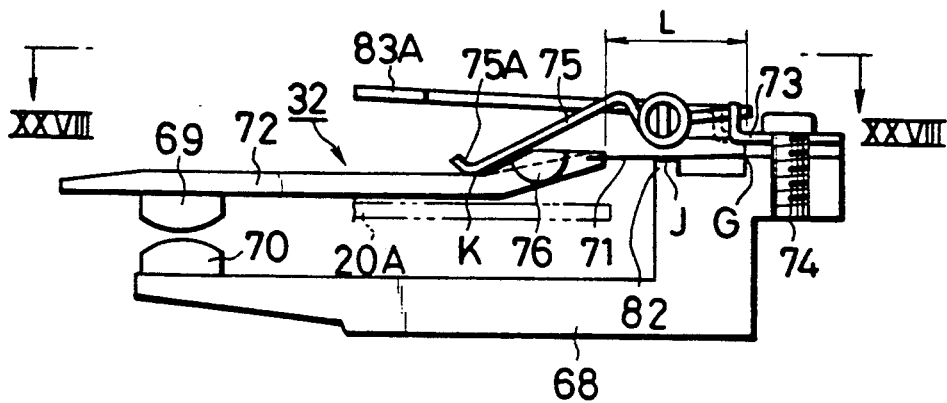
FIGS. 29 and 30 are partial side views showing a major arrangement of a third embodiment of the disk drive of the present invention.
Figure 30:
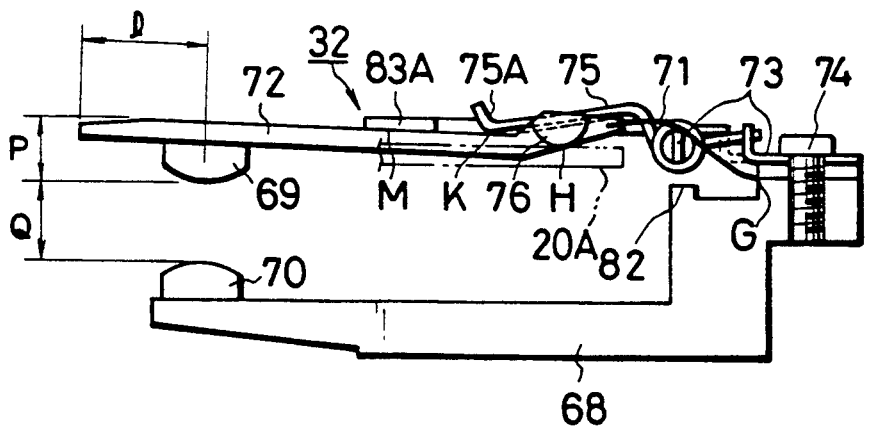
Figure 31:
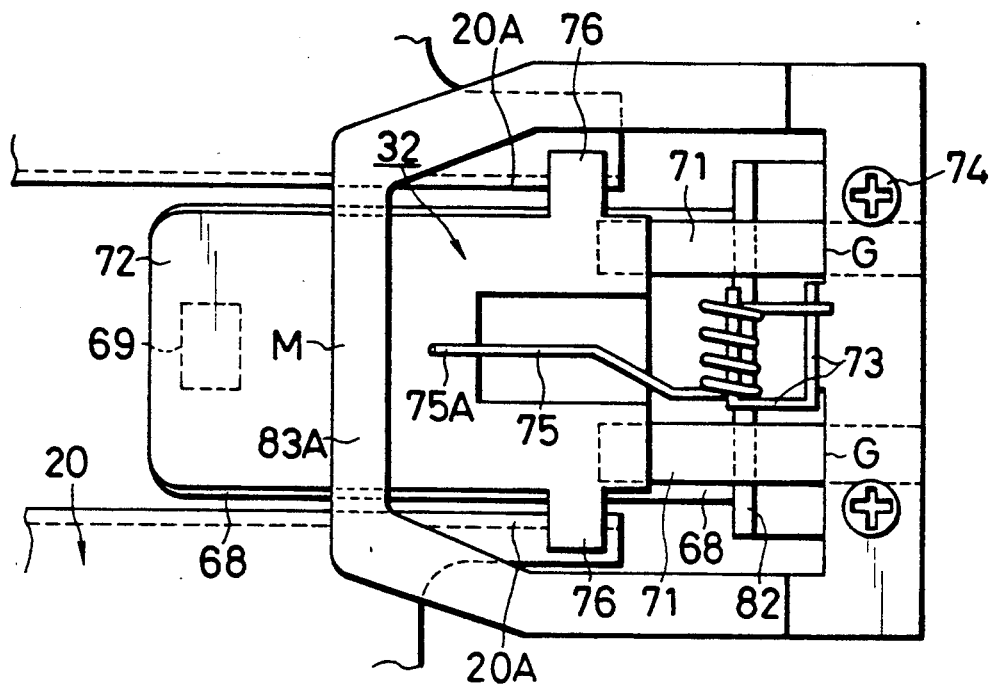
FIG. 31 is a plan view taken along the line XXVIII-—XXVIII of FIG. 29.

FIGS. 29 and 30 are partial side views showing a major arrangement of a third embodiment of a disk apparatus of the present invention: FIG. 29 shows the lowered position or the loaded position of the heads; and FIG. 30 shows the raised position or the unloaded position of the heads. FIG. 31 is a plan view taken along the line XXVIII—XXVIII of FIG. 29.

The third embodiment differs from the first embodiment in that a stopper 83A is disposed on the carriage 68 rather than on the cassette guide 20 as in the second embodiment.

The stopper 83A is provided on the carriage 68 to limit the upper limit position of the arm 72. In this embodiment, the stopper 83A is integrally formed with the supporting member 73 which is fixed on the carriage 68, and is extended so that the stopper 83A can make contact with the top surface of the arm 72, thereby to limit the upper limit position of the arm.

The contact point of the stopper 83A and the arm 72, that is, the stop point M, is set at a position closer to the head 69 than the point H for raising and lowering the arm 72 is to the head. In FIG. 30, the stop point M is positioned closer to the head than the load point K is to the head so that the points M, K and H are aligned in this order. The stop point M, however, may exchange its position with the load point K so that the stop points M are positioned farther from the head 69 than the load point K is from the head 69 as long as the stop points M are located closer to the head than the raising point H is to the head. In this case, the points K, M and H are aligned in this order.

The disk drive as the third embodiment of the present invention is constructed as described above. In short, the disk drive, in which the arm (72) having the head (69) is supported by the elastic member or the elastic portion (71) in such a manner that the arm can be raised or lowered, and in which the stopper (83A) for restricting the upper limit position of the arm (72) is disposed on the carriage (68), is provided.

Furthermore, the stopper 83A is arranged so that it can make contact, when the head is raised, with the arm 72 at the stop point M positioned closer to the head 69 than the point H for raising and lowering the arm 72 is to the head.

Figure 32:
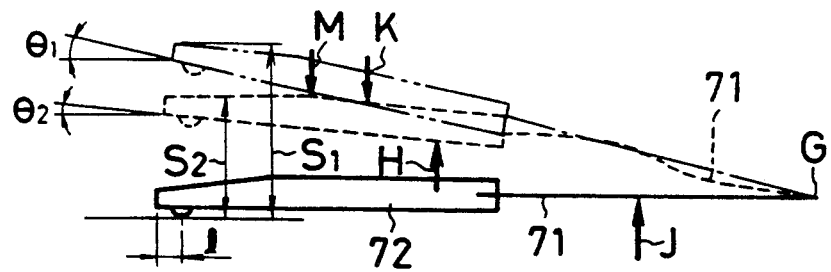
FIG. 32 is a schematic diagram for explaining the raising and lowering operation of the head with the arm and the leaf spring shown in FIG. 29.

FIG. 32 is a schematic diagram for explaining the raising and lowering operation of the head with the head unit 32 explained in FIGS. 29-31.

In FIG. 32, solid lines indicate the lowered state of the arm 72 (FIG. 29), and broken lines represent the raised state of the arm 72 (FIG. 30) of this embodiment, and phantom lines (alternate long and two short dashes line) indicate the raised state of the arm of a conventional unit head.

FIG. 32 differs from FIG. 24 of the first embodiment in that the stop point M for limiting the upper limit position of the arm 72 is added in FIG. 32. Because the stopper 83A for limiting the upper limit of the arm 72 is provided in addition to the head loading spring 75, the upper limit position of the arm 72 can be more positively restricted. In this case, since the stopper 83A is disposed on the carriage 68, the upper limit position of the arm 72 mounted on that same carriage can be limited with high accuracy.

According to the third embodiment described above, the highest position S of the arm 72, that is, the highest position of the head unit 32 can be reduced by employing the construction in which the head 69 is mounted on the arm 72 supported through the intermediary of the leaf spring 71. This is because the load point (the pressure point) K of the head loading spring 75 is set closer to the head 69 than the point H on which the head raising force act is to the head 69, and hence the greater head-bending effect can be provided to the leaf springs 71 when the head 69 is raised (unloaded state) about the fulcrum G.

As a result, the third embodiment can achieve effects similar to those of the first embodiment.

Furthermore, since the stopper 83A is provided on the carriage 68 for raising and lowering the arm 72 in such a manner that the stopper is disposed closer to the head 69 than the point H for raising and lowering the arm 72 is to the head 69, the highest position of the arm 72 is positively restricted, and the maximum height S of the arm 72 can be further reduced by further improving the head-bending effect of the leaf spring 71.

EMBODIMENT 4

Figures 33, 34:
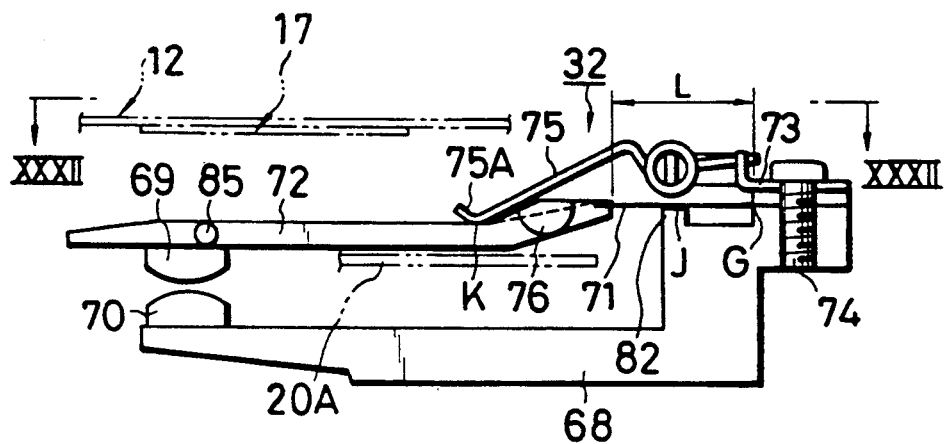
FIGS. 33 and 34 are partial side views showing a major arrangement of a fourth embodiment of the disk drive of the present invention.
Figure 35:
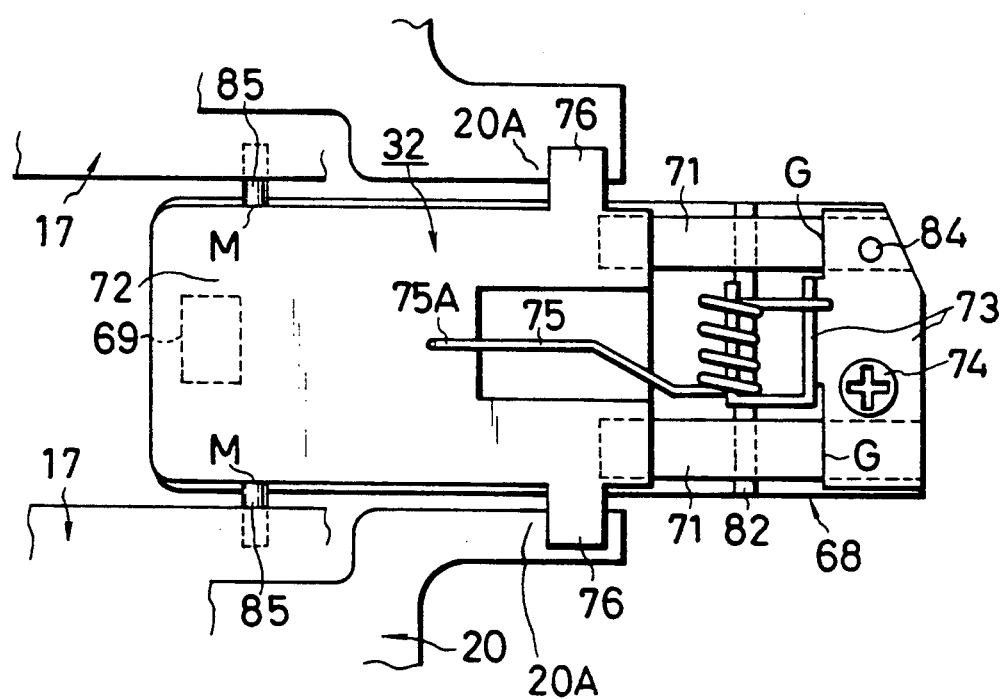
FIG. 35 is a plan view taken along the line XXXII-—XXXII of FIG. 33.

FIGS. 33 and 34 are partial side views showing a major arrangement of a fourth embodiment of the disk drive of the present invention: FIG. 33 shows the lowered position or the loaded position of the heads; and FIG. 34 shows the raised position or the unloaded position of the heads. FIG. 35 is a plan view taken along the line XXXII—XXXII of FIG. 33.

Figure 36:
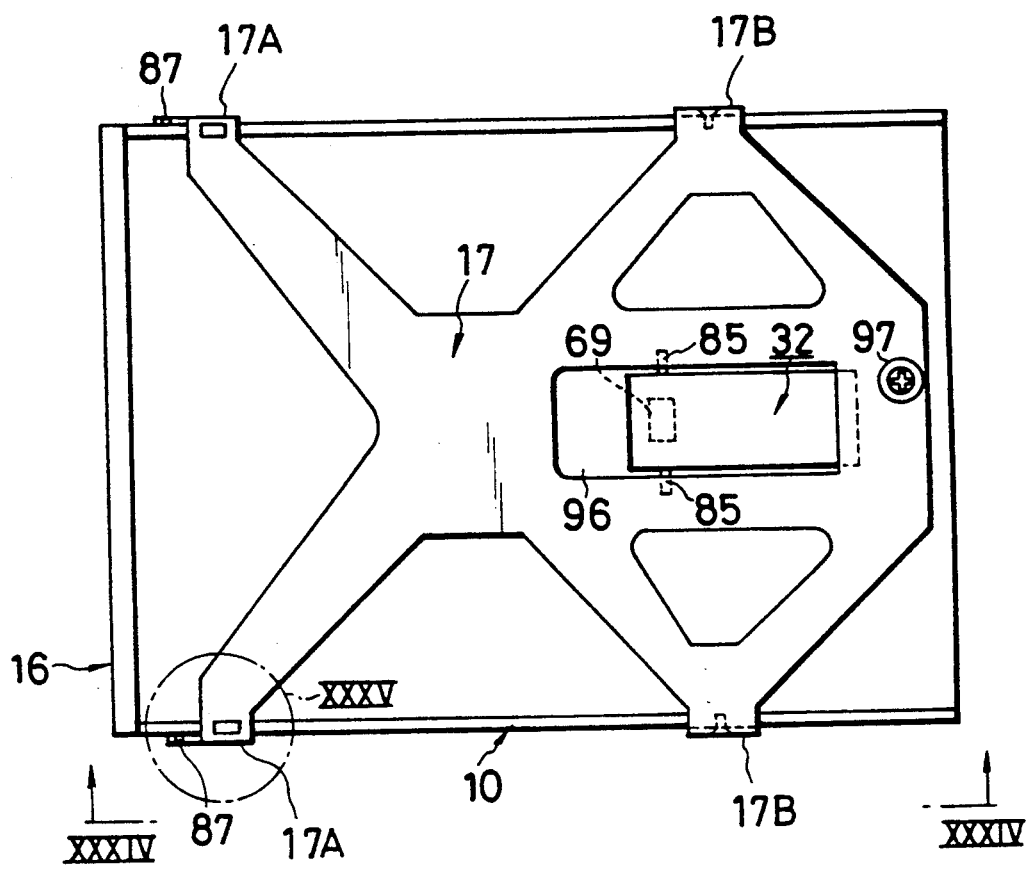
FIG. 36 is a plan view showing a base and a head unit of the disk drive of the fourth embodiment of the present invention.
Figure 37:
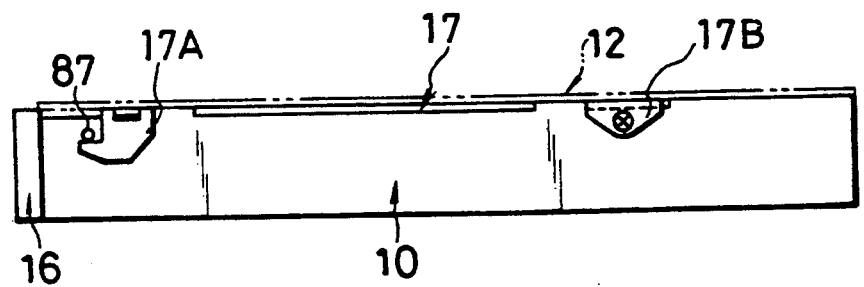
FIG. 37 is a side view taken along the line XXXIV—XXXIV in FIG. 36.
Figure 38:
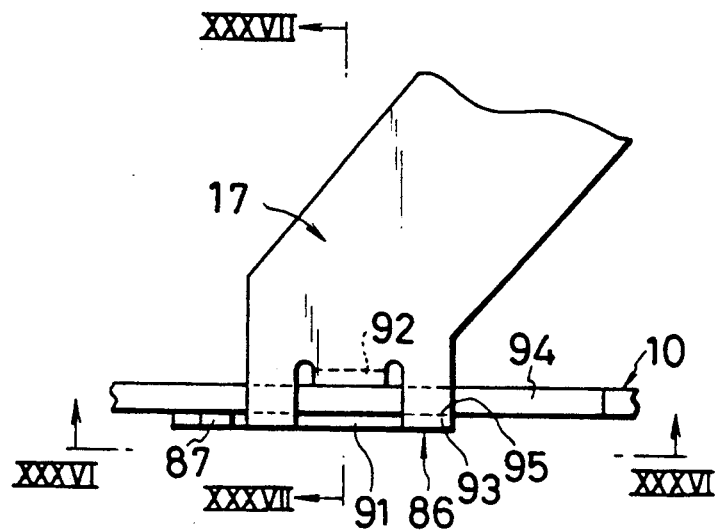
FIG. 38 is a fragmentary plan view in a circle XXXV.
Figure 39:
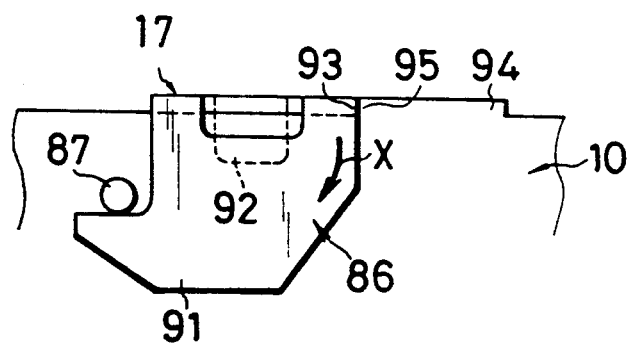
FIG. 39 is a fragmentary sectional view taken along the line XXXVI—XXXVI in FIG. 38.
Figure 40:
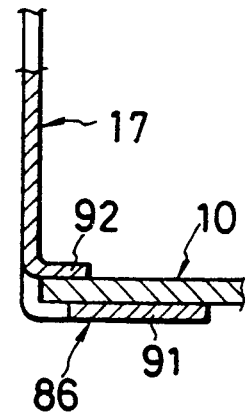
FIG. 40 is a fragmentary cross-sectional view taken along the line XXXVII—XXXVII of FIG. 38.

FIG. 36 is a plan view showing the base and the head unit of the disk drive of the fourth embodiment of the present invention, FIG. 37 is a side view taken along the line XXXIV—XXXIV in FIG. 36, FIG. 38 is a fragmentary plan view in a circle XXXV, FIG. 39 is a fragmentary sectional view taken along the line XXXVI—XXXVI in FIG. 38, and FIG. 40 is a fragmentary cross-sectional view taken along the line XXXVII—XXXVII of FIG. 38.

The fourth embodiment differs from the first to third embodiments in that a stopper 17 is disposed on the base 10 and stop pins 85 are provided on both sides of the arm 72.

More specifically, the reinforcing plate 17 as the stopper for restricting the upper limit position of the arm 72 is fixed on the base 10 as shown in FIG. 36. On the other hand, at predetermined positions on both sides of the arm 72 (in the example shown in FIG. 35, near the head 69 in the longitudinal direction of the arm), stop pins 85 are provided in such a manner that the pins can make contact with the bottom surface of the stopper 17. The positions of the stop pins 85, that is, the positions (stop point) M at which the stop pin 85 of the arm 72 makes contact with the stopper 17 at the raised position of the head 69, are set at a position closer to the head 69 than the point H for raising and lowering the arm is to the head.

In FIG. 34, the stop points M are positioned closer to the head than the load point K is to the head (about the same position to that of the head 69) so that the points M, K and H are aligned in this order. The stop point M, however, can exchange its position with the load point K so that the stop points M are positioned farther from the head 69 than the load point K is from the head 69 as long as the stop points M are located closer to the head than the point H is to the head. In this case, the points K, M and H are aligned in this order.

In FIGS. 36 and 37, the reinforcing plate (the stopper) 17 is fixed on the top of the base 10 as follows: first, bent portions 17A formed at the front portion (on the front panel 16 side) of both sides of the reinforcing plate 17 are fit to the projections 87 on both sides of the base 10; and at the same time, bent portions 17B formed at rear portions of both sides of the reinforcing plate 17 are fastened to both sides of the base 10 with screws, thus the reinforcing plate 17 is attached on the top of the base 10.

Although in this embodiment, the stopper 17 is composed of a plate (the reinforcing plate), the stopper may be composed of a thinner planar material with reinforcement beads formed thereon. In FIGS. 38-40, each bent portion 17A has an outer limiting portion 91 and an inner limiting portion 92: the outer limiting portion 91 is a hook-shaped portion that engages the projection 87, and makes contact with the outer side wall of the base 10; and the inner limiting portion 92 makes contact with the inner side wall of the base 10. A rear top surface 93 of each bent portion 17A make contact with a front end 95 of the reference projection 94 of the top surface of the base 10, and the surfaces 93 and 95 constitute pulling force acting points of the reinforcing plate 17. Fastening of the reinforcing plate 17 to the base 10 is carried out as follows: first, the bent portions 17A on both sides of the reinforcing plate are turned in the direction of the arrow X in FIG. 39 so that the projections 87 of the base 10 fit into the bent portions 17A; and then the bent portions (screw fastening portions) 17B at the rear portion of the apparatus are fastened to the base 10 with the reinforcing plate 17 maintaining contact with the bent portions 17A at the pulling force acting points.

The accuracy of these portions is kept high so by that little space is produced between the rear top surfaces 93 of the bent portions 17A, which form the pulling force acting points, and the reference projections 94 in the state that the reinforcing plate 17 is attached to the base 10. Thus, the reinforcing plate 17, which is attached to the base 10, functions as a reinforcement against external force exerting on the base 10, because the reinforcing plate 17 is pulled via the pulling force acting points when the base 10 is subjected to the external force.

Incidentally, the reinforcing plate 17 has an opening at the portion corresponding to the head unit 32, and side edges of the opening 96 (see FIG. 36) and the stop pins 85 constitute a stopper mechanism that limits the upper limit position of the arm 72 of the head unit 32. On the reinforcing plate 17 there is provided a cover 12.

Furthermore, a hole 97 is formed at a predetermined position of the reinforcing plate 17 so that through this hole 97, predetermined components on the base 10 such as a sensor for detecting the alignment of the reference track and the heads or the like can be fastened by a screw even after the reinforcing plate 17 has been attached to the base 10.

The disk drive as the fourth embodiment of the present invention is constructed as described above. In short, the disk drive, in which head (69) is attached to the arm (72) supported by the elastic member or the elastic portion (71), and in which the upper limit position of the arm (72) is limited by the stopper (17) fixed to the base 10 of the disk drive, is provided.

Furthermore, the stopper 17 is arranged so that it can make contact, when the head is raised, with the arm (72) at the stop points M positioned closer to the head (69) than the point H for raising and lowering the arm (72) is to the head.

Figure 41:
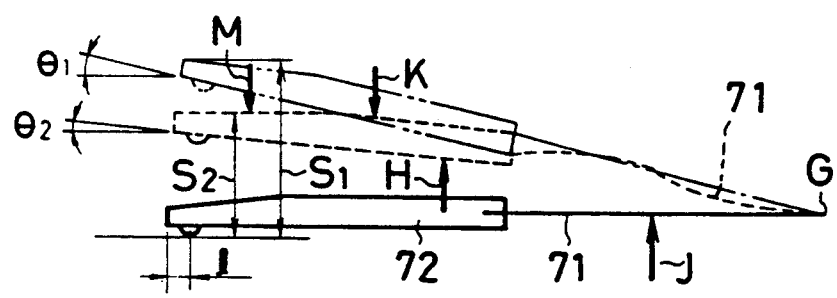
FIG. 41 is a schematic diagram for explaining the raising and lowering operation of the head with the arm and the leaf spring shown FIG. 33.

FIG. 41 is a schematic diagram for explaining the raising and lowering operation of the head unit 32 explained in FIGS. 33-40.

In FIG. 41, solid lines indicate the lowered state of the arm 72 (FIG. 33), and broken lines represent the raised state of the arm 72 (FIG. 34) of this embodiment, and phantom lines indicate the raised state of the arm of a conventional unit head. These states are similar to that of the second embodiment as shown FIG. 28.

Reference character Q in FIG. 34 denotes a space between the heads 69 and 70 when the head 69 is raised.

According to the fourth embodiment, the upper limit position of the arm 72 is more positively restricted than the first embodiment because the reinforcing plate 17 is used as a stopper in addition to the head loading spring 75. Furthermore, the stopper 17 functions as a reinforcement of the base 10, so that this one stopper 17 can serve both as a member for limiting the maximum height of the head unit 32, and as a reinforcement of the base 10.

Moreover, the contact points (the stop points) M of the stoppers 17 and the stop pin 85 of the arm 72 are positioned closer to the head 69 than the point H for raising or lowering the arm 72 is to the head 69. This will serve to further improve the head-bending effect with the head loading spring 75, thereby making easier for the arm 72 to approach the horizon when the head is raised.

According to the fourth embodiment described above, the highest position S of the arm 72, that is, the highest position of the head unit 32, can be reduced by employing the construction in which the head 69 is mounted on the arm 72 supported through the intermediary of the leaf spring 71. This is because the load point (the pressure point) K of the head loading spring 75 is set closer to the head 69 than the point H on which the head raising force act is to the head 69, and hence the greater head-bending effect can be provided to the leaf springs 71 when the head 69 is raised (unloaded state) about the fulcrum G.

As a result, the fourth embodiment can achieve effects similar to those of the first embodiment.

Furthermore, since the stopper 17 is provided on the base 10 in such a manner that the stopper is disposed closer to the head 69 than the point H for raising and lowering the arm 72 is to the head 69, the highest position of the arm 72 is positively restricted, and the maximum height S of the arm 72 can be further reduced by further improving the head-bending effect of the leaf spring 71.

In addition, since the reinforcing plate 17 is made contact with the base 10 via the pulling force acting points, it functions, in the case where the base 10 is subjected to external force, as a reinforcement against the external force by producing pulling force by itself. Accordingly, thickness of the base 10 can be thinned, which enables the base 10 to be lighter and thinner.

The reinforcing plate 17 is preferably made thin and has beads formed thereon. In addition, the reinforcing plate 17 is preferably constructed in such a way that there is no opening such as a window on diagonals connecting the four fastening portions thereof, that is, on the lines connecting the bent portion 17A of each side and the (screw fastening) bent portion 17B of the opposite side so that no warp is produced in the reinforcing plate 17 when it is subjected to the pulling force.

The cover 12, which is attached to the top of the reinforcing plate 17, can be made of a very thin and light material like a plastic film as long as the material has dust resistant effect because the reinforcing plate 17 of a construction described above functions not only as a reinforcement of the base 10 but also as a shield of component parts. In addition, since the reinforcing plate 17 is located above and in close proximity to the head unit 32, the reinforcing plate 17 can protect the heads 69 and 70 and thereabout.

EMBODIMENT 5

Figure 42:
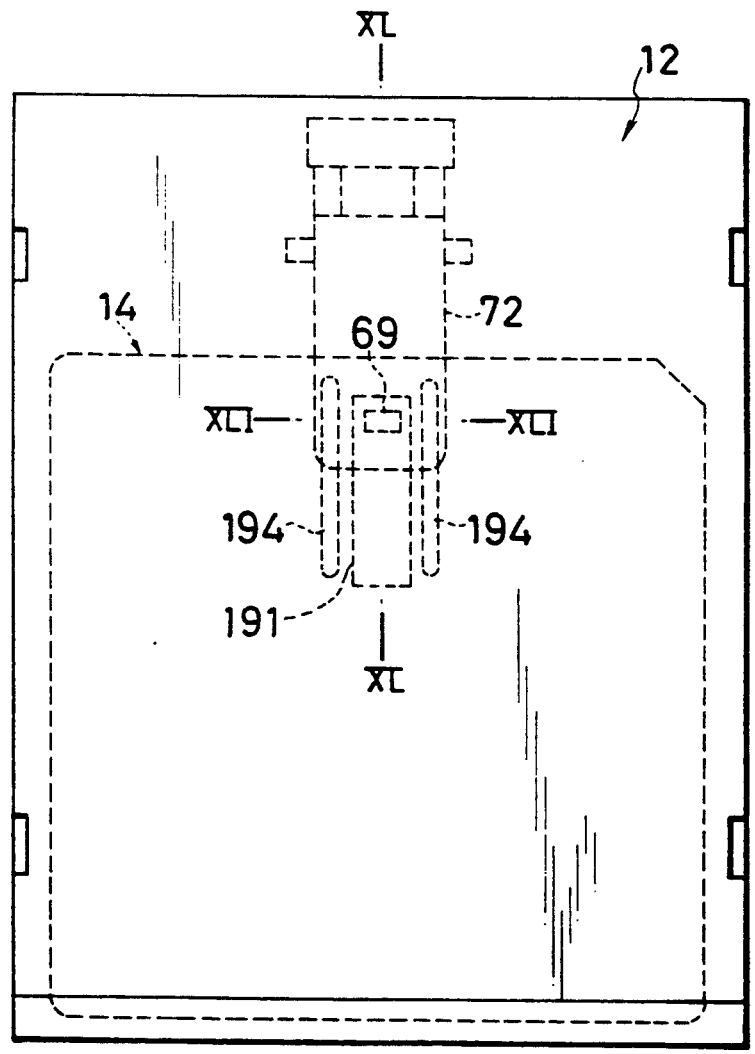
FIG. 42 is a plan view showing the construction of a major portion of a fifth embodiment of the disk drive of the present invention.
Figure 43:
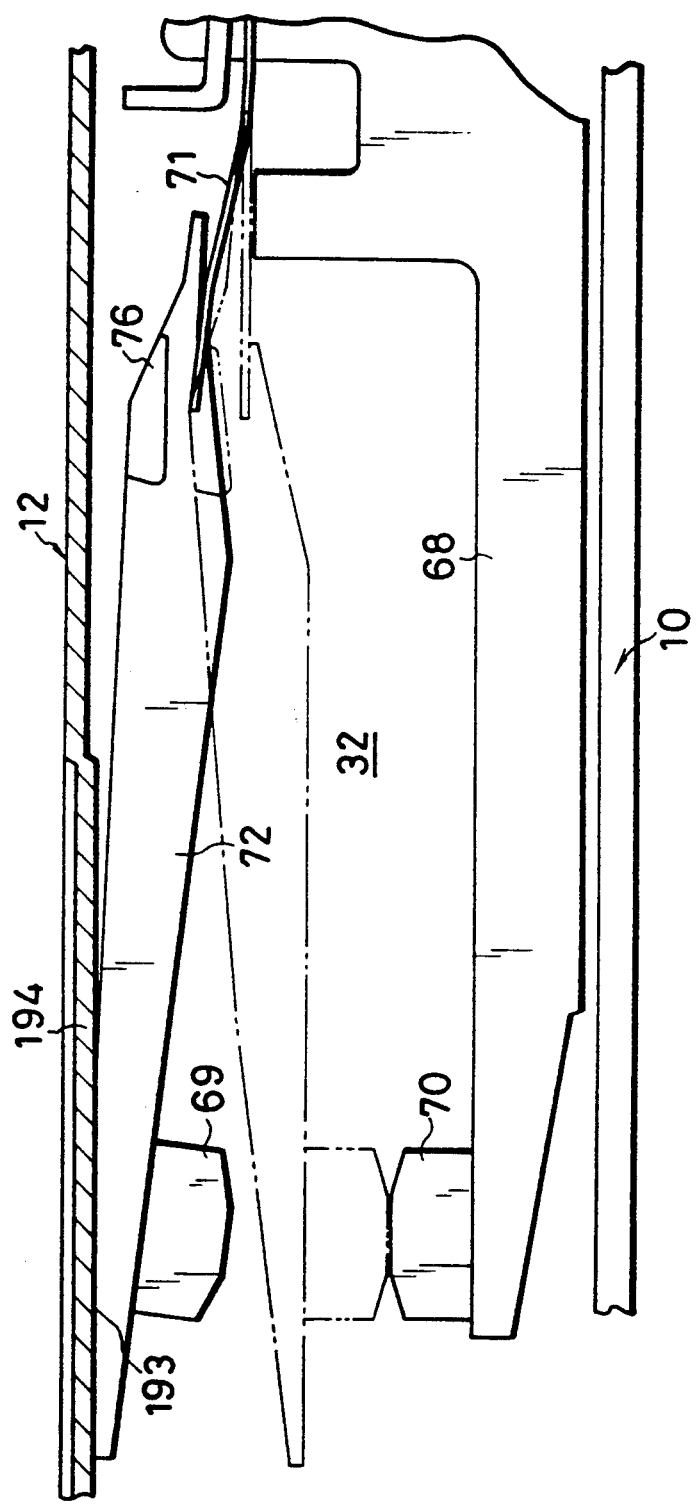
FIG. 43 is a fragmentary longitudinal sectional view taken along the line XL—XL in FIG. 42.
Figure 44:
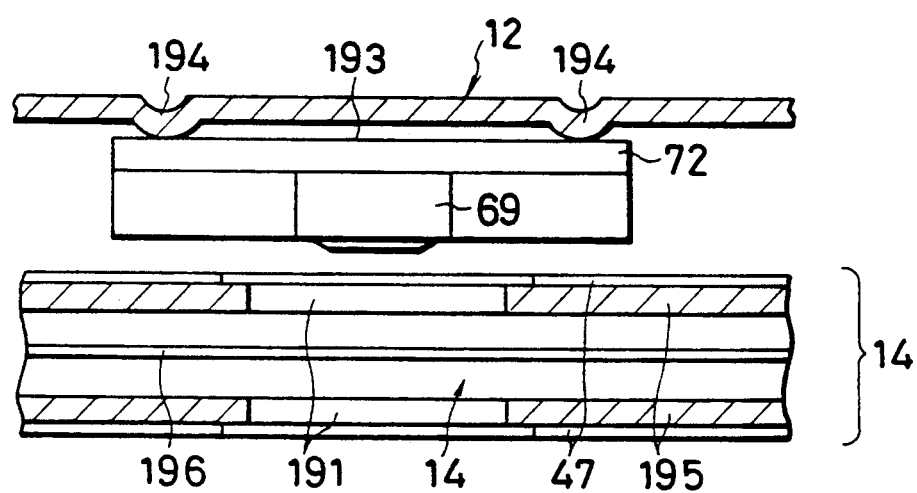
FIG. 44 is a sectional view taken along the line XLI—XLI in FIG. 42.

FIG. 42 is a plan view showing the construction of a major portion of a fifth embodiment of the disk drive of the present invention, FIG. 43 is a fragmentary longitudinal sectional view taken along the line XL—XL in FIG. 42, and FIG. 44 is a sectional view taken along the line XLI—XLI in FIG. 42.

In FIGS. 42-44, there are provided in the disk cassette 14 head accepting apertures 191 which are usually covered with the shutter 47 and are made open by moving the shutter 47 with the shutter lever 112 when the cassette is loaded. The head accepting apertures 191 are usually provided in both surfaces of the disk cassette 14 (see FIG. 44) so that they can be opened by moving the shutter 47 at same time. The heads 69 and 70 are made to contact with a disk (recording medium) 196 through the head accepting apertures 191 in the head loaded state, and are moved in a radial direction of the disk during the seek operation. The disk cassette 14 is arranged in such a manner that, as shown in FIG. 44, it rotatably holds the disk 196 in the cassette case 195, and the head accepting apertures 191 are formed in the cassette case 195.

In the unloaded state where the head arm 72 is raised, the top surface of the tip of the head arm 72 makes contact with the inner surface of the cover 12 as shown by solid lines in FIG. 43 so that the raised position of the head arm 72 is restricted. In this embodiment, beads (or ribs) 194 that project from the inside of the cover 12 are formed thereon, and the beads 194 constitute a stopper for limiting the raised position of the head arm 72. The beads 194 are provide on both sides of the head accepting aperture 191 so as to make contact with both sides of the head arm 72. The length of each bead 194 is determined considering the seek distance of the head arm 72. In addition, the positions of the beads 194, that is, the positions of the contact positions between the head arm 72 and the cover 12 are located outside the head accepting aperture 191. The contact positions of the beads 194 with the head arm 72 are preferably spaced from the head accepting aperture 191 as long as possible.

According to the fifth embodiment, the upper limit position of the head arm 72 is restricted by the cover 12 with which the head arm 72 slidably makes contact. Thus, the thickness (height) of the disk drive can be made smaller than that having the stopper for restricting the height of the arm 72 as the embodiments described before. In addition, positioning the stopper (bead) 194 at a place separated from the head accepting aperture 191 makes it possible to prevent dust and dirt from entering inside the disk cassette through the head accepting aperture 191 even if dust such as abrasion dust is produced by the friction between the head arm 72 and the stopper 194 of the cover 12. Accordingly, damage to the disk 196 by dust or the like can be eliminated.

EMBODIMENT 6

Figure 45:
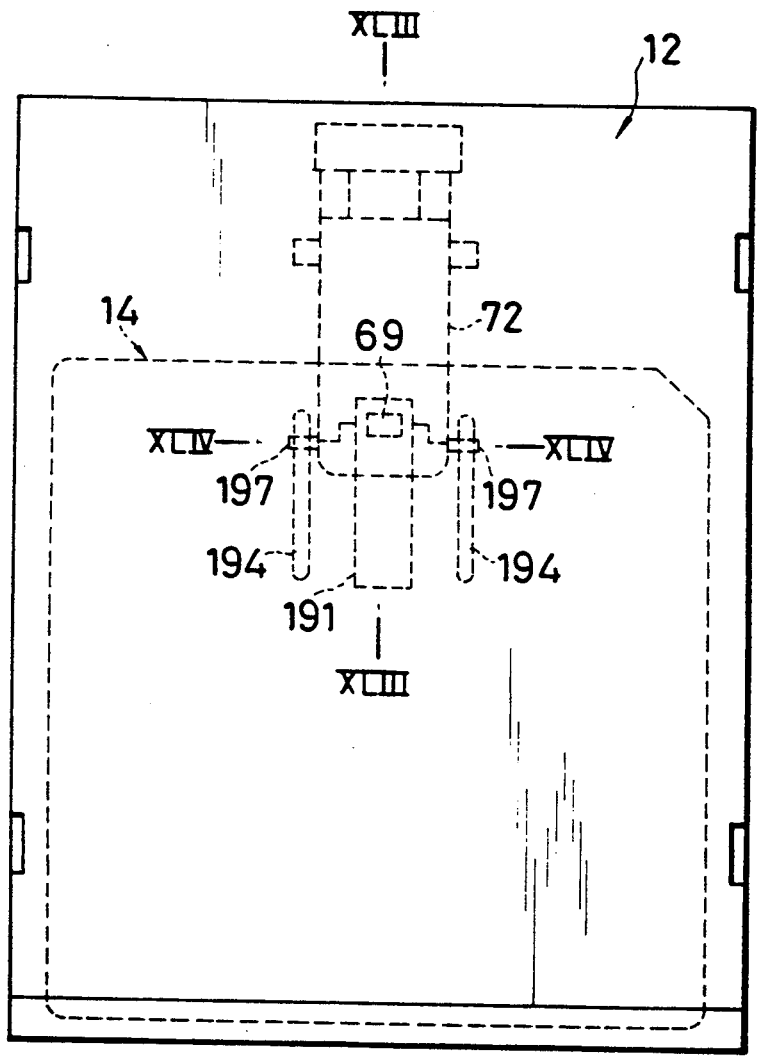
FIG. 45 is a plan view showing the construction of a major portion of a sixth embodiment of the disk drive of the present invention.
Figure 46:
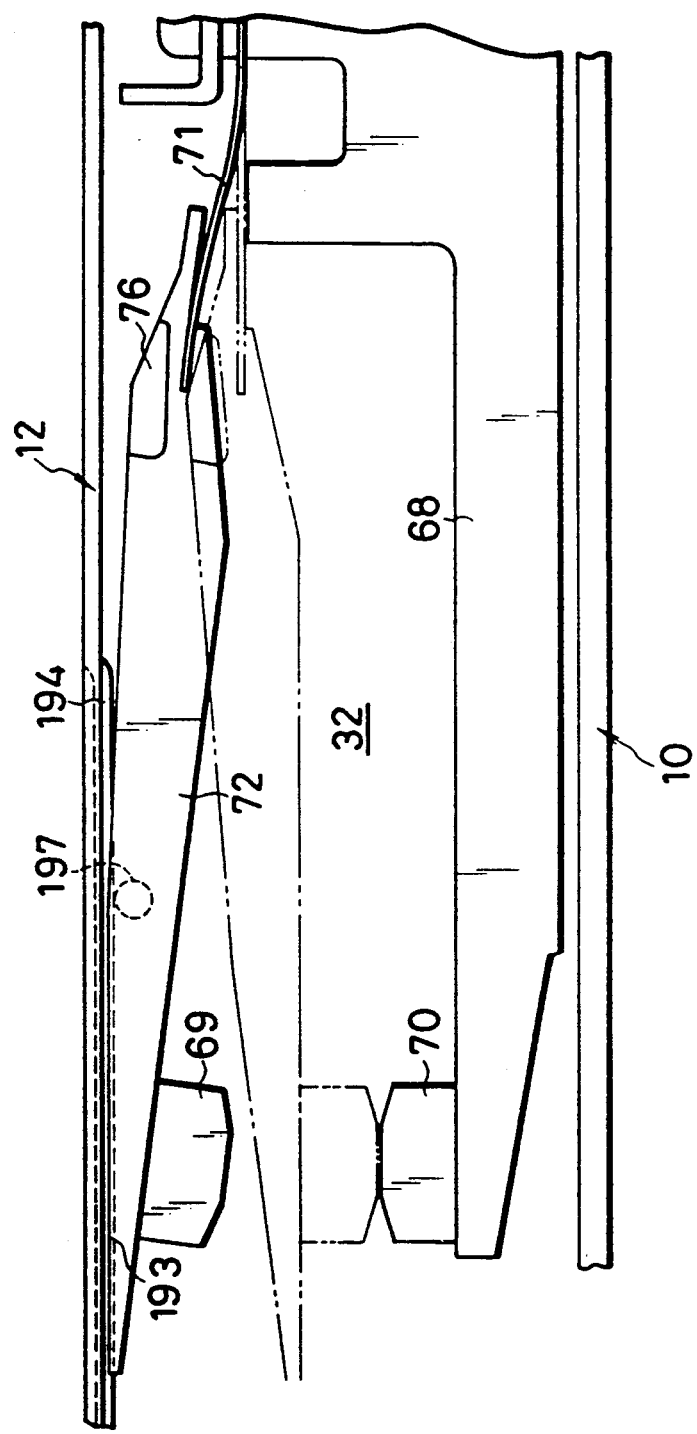
FIG. 46 is a fragmentary longitudinal sectional view taken along the line XLIII—XLIII in FIG. 45.
Figure 47:
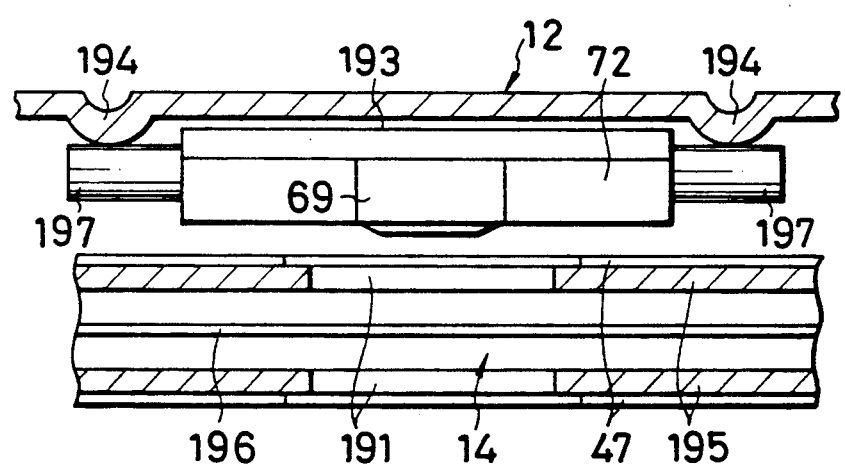
FIG. 47 is a sectional view taken along the line XLIV—XLIV in FIG. 45.

FIG. 45 is a plan view showing the construction of a major portion of a sixth embodiment of the disk drive of the present invention, FIG. 46 is a fragmentary longitudinal sectional view taken along the line XLIII—XLIII in FIG. 45, and FIG. 47 is a sectional view taken along the line XLIV—XLIV in FIG. 45.

In this embodiment, on each side of the head arm 72, are provided stopper bosses 197 that can make slidably contact with the beads 194 of the cover 12, thereby limiting the raised position (unloaded height) of the head arm 72. Positions of the stopper bosses 197 which are formed on each side of the head arm 72 (i.e., positions at which the head arm 72 makes contact with the cover 12) are selected in such a way that they are sufficiently separated from each side of the head accepting aperture 191. In addition, the stopper bosses 197 are formed at a position slightly lower than the top surface 193 of the tip of the head arm 72. The other portions of the sixth embodiment have the same arrangement as those of the fifth embodiment, and so the corresponding portions are designated by the same reference numerals and the description thereof are omitted.

According to the sixth embodiment of FIGS. 45-47, effects similar to those of the fifth embodiment can be achieved. In addition, the height of the disk drive can be made still smaller than that of the fifth embodiment by about the thickness of the beads 194. This is because the height of the cover 12 can be reduced to such an extent that the top surface 193 of the head arm 72 nearly makes contact with the inner surface of the cover 12 since the disk drive is arranged in such a manner that the stopper bosses 197 projecting from each side of the head arm 72 make contact with the beads 194 of the cover 12. Moreover, this arrangement can more positively prevent dust such as abrasion particles from entering inside through the head accepting aperture 91 because the distance between the sliding portion of the stopper bosses 197 with the beads 194 and each side of the head accepting aperture 191 can be made longer than in the fifth embodiment.

EMBODIMENT 7

Figure 48:
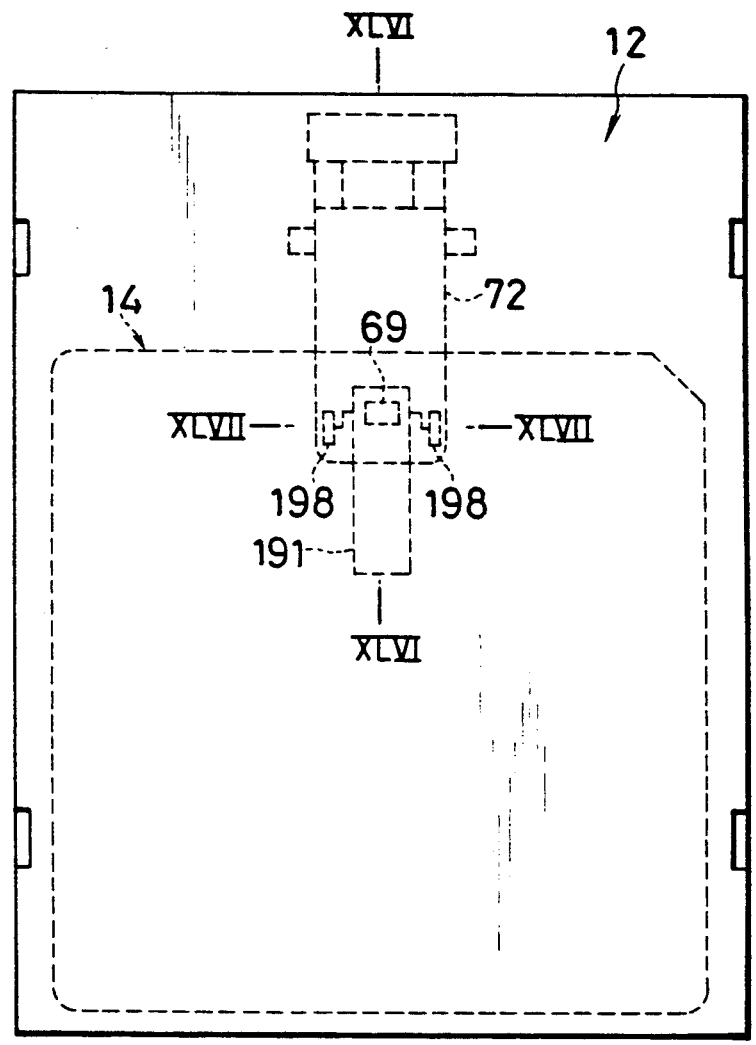
FIG. 48 is a plan view showing the construction of a major portion of a seventh embodiment of the disk drive of the present invention.
Figure 49:
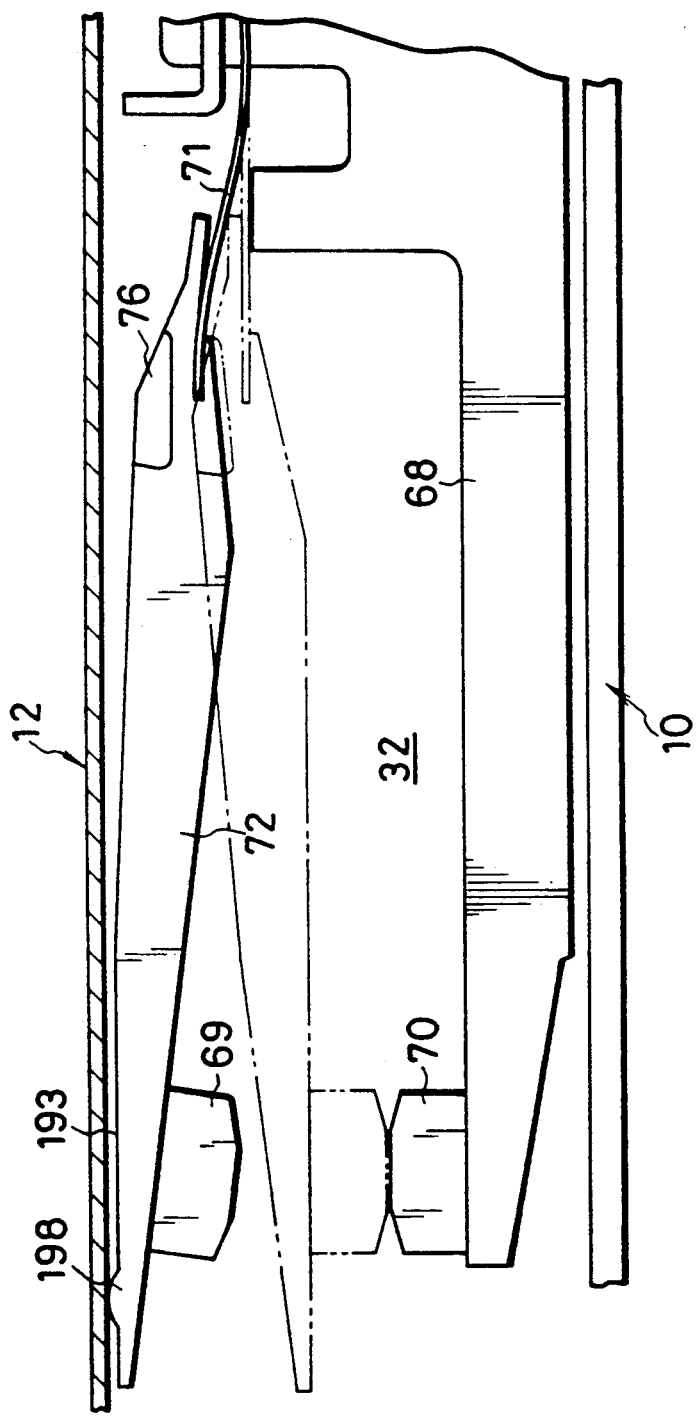
FIG. 49 is a fragmentary longitudinal sectional view taken along the line XLVI—XLVI in FIG. 48.
Figure 50:
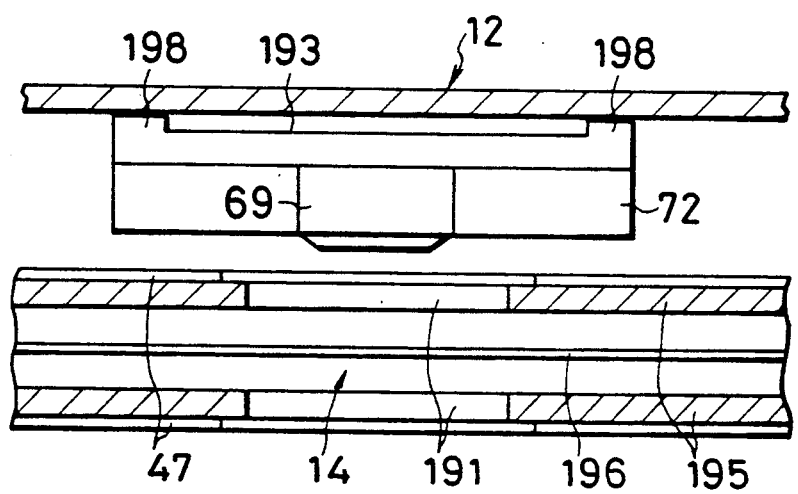
FIG. 50 is a sectional view taken along the line XLVII—XLVII in FIG. 48.

FIG. 48 is a plan view showing the construction of a major portion of a seventh embodiment of the disk drive of the present invention, FIG. 49 is a fragmentary longitudinal sectional view taken along the line XLVI—XLVI in FIG. 48, and FIG. 50 is a sectional view taken along the line XLVII—XLVII in FIG. 48.

In this embodiment, on each side of top surface of the tip of the head arm 72, are provided stopper convex portions 198 that can slidably make direct contact with the cover 12, thereby limiting the raised position (unloaded height) of the head arm 72. Lateral positions of the stopper convex portions 198 which are formed on each side of the head arm 72 (i.e., positions at which the head arm 72 makes contact with the cover 12) are selected in such a way that they are sufficiently separated from each side of the head accepting aperture 191. In short, this embodiment uses the convex portions 198 provided on the head arm 72 as stoppers in place of the beads 194 of the fifth embodiment. The other portions of the sixth embodiment have substantially the same arrangement as those of the fifth embodiment, and so the corresponding portions are designated by the same reference numerals and the description thereof are omitted.

According to the seventh embodiment of FIGS. 48-50, the height of the disk drive, as described in the fifth embodiment, can be made smaller than that of the conventional disk drive, thus reducing the thickness of the apparatus. Moreover, this arrangement can more positively prevent dust from entering inside the disk cassette through the head accepting aperture 191 even when the sliding between the head arm 72 and the cover 12 produces dust such as abrasion particles because the distance between the sliding portions stopper (the convex portions) 198 of the head arm 72 and each side of the head accepting aperture 191 can be elongated. Thus, damage to the disk 196 from dust or dirt can be eliminated.

EMBODIMENT 8

Figure 51:
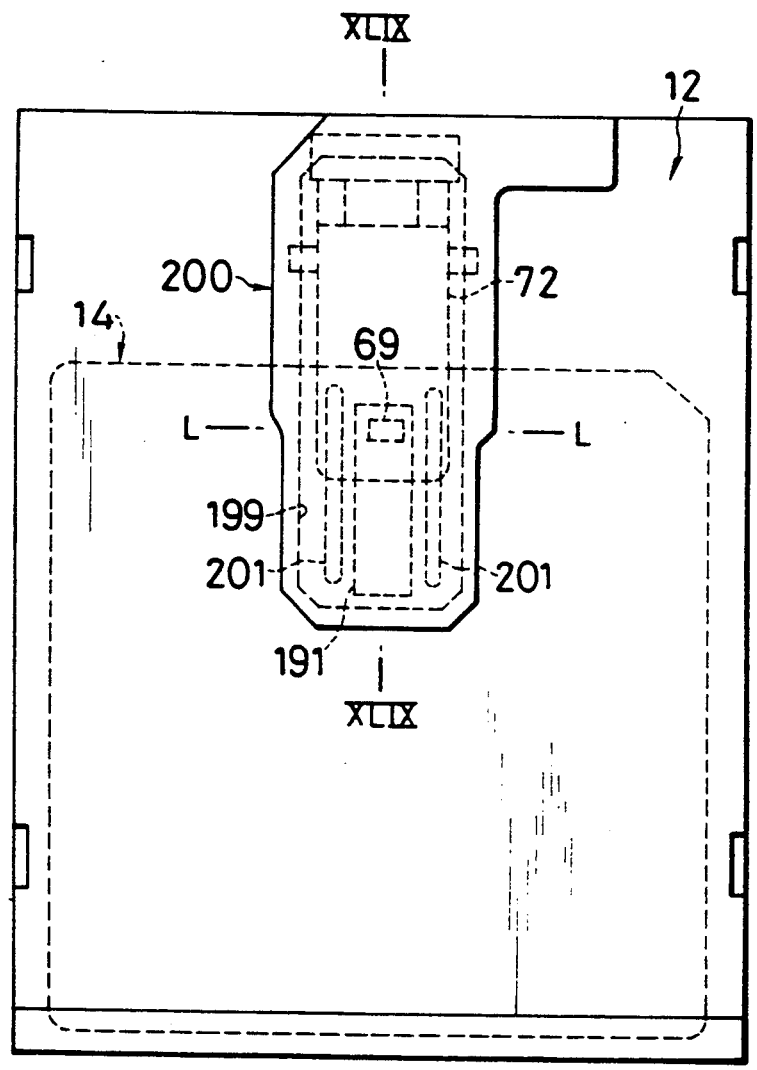
FIG. 51 is a plan view showing the construction of a major portion of an eighth embodiment of the disk drive of the present invention.
Figure 52:
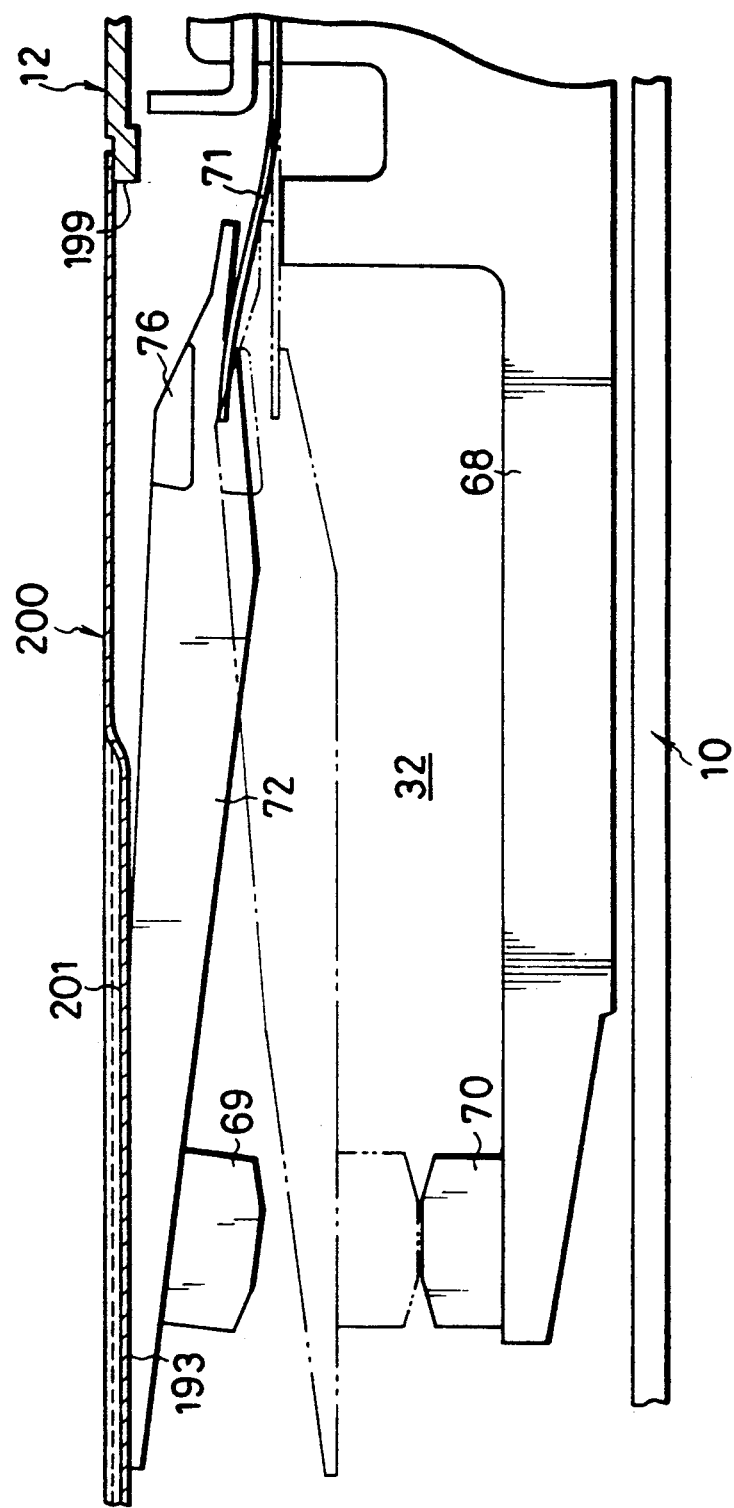
FIG. 52 is a fragmentary longitudinal sectional view taken along the line XLIX—XLIX in FIG. 51.
Figure 53:
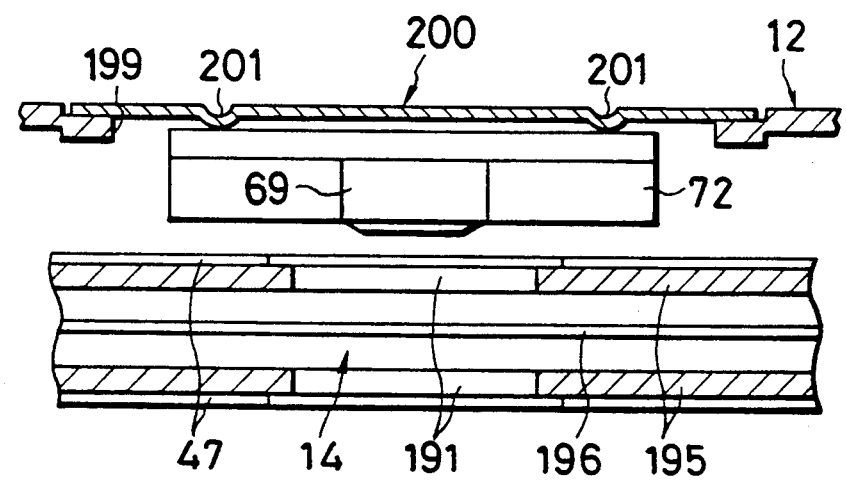
FIG. 53 is a sectional view taken along the line L—L in FIG. 51.

FIG. 51 is a plan view showing the construction of a major portion of an eighth embodiment of the disk drive of the present invention, FIG. 52 is a fragmentary longitudinal sectional view taken along the line XLIX—XLIX in FIG. 51, and FIG. 53 is a sectional view taken along the line L—L in FIG. 51.

In this embodiment, a cap 200 is provided above the head arm 72 as follows: first, an opening 199 is formed in the cover 12 in such a manner that the opening 199 is placed above the head unit 32; and the opening is covered by the cap 200 made of a thinner plate than the material of the cover 12. The cap 200 constitutes a stopper for limiting the raised position of the head arm 72.

In FIGS. 51-53, on the under surface of the cap 200 covering the opening 199 of the cover 12, there is provided stopper beads 201 which slidably makes contact with each side of the top surface 193 of the tip of the head arm 72 so as to limit the raised position of the head arm 72. In this case, the lateral positions of the beads 201 formed on each side of the head arm 72 are selected in such a way that the beads are placed as far as possible outside the side edges of the head accepting aperture 191 (in FIGS. 51-53, the beads are placed at lateral places substantially identical to those of the fifth embodiment shown in FIGS. 42-44). Thickness of the late of the cap 200 can be selected at about 0.08-0.15 mm, whereas that of the cover 12 is about 0.2-0.6 mm. The other portions of the eighth embodiment have substantially the same arrangement as those of the fifth embodiment, and so the corresponding portions are designated by the same reference numerals and the description thereof are omitted.

According to the eighth embodiment of FIGS. 51-53, effects similar to those of the fifth embodiment can be achieved. Furthermore, the height of the disk drive can be made still smaller than that of the fifth embodiment by a dimension close to the difference between the thicknesses of the cover 12 and the cap 200. This is because this embodiment is arranged in such a fashion that the head arm 72 slidably makes contact with the stopper 201 formed on the cap 200 thinner than the cover 12. Moreover, this arrangement facilitates maintenance and examination of the disk drive because the cap 200 is removably attached to cover 12, and hence an operator can access the head unit 32 by only removing the cap 200.

In the sixth to eighth embodiments above, although the stoppers are composed of convex portions formed on the cover 12 or on the head arm 72 so that sliding resistances can be reduced, the convex portions are not essential: convex portions can be replaced with planar portions. In such a case, sheets made from lubricating materials such as polytetrafluoroethylene (Teflon) may be affixed to the contact portions on the cover 12 or on the head arm 72. The convex portions which are provided on each side of the cover or head arm can be replaced with one convex portion formed at the center thereof.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A disk drive for recording data to or reproducing data from a disk comprising:
   a head for writing the data into or reading the data out of the disk by sliding on said disk or gliding over said disk;
   an arm member for holding said head;

support means for supporting said arm member via an elastic member so that said arm member can be raised or lowered;

load means for exerting a force on a first position of said arm member so as to place said head on the disk or to make said head approach the disk; and unload means for exerting a force on a second position of said arm member so as to separate said head from the disk, said second position being more distant from said head than said first position from said head in a longitudinal direction of said arm member.

2. A disk drive as claimed in claim 1, wherein said disk drive comprises a restriction member for restricting said elastic member displacing in the direction of the disk.

3. A disk drive for recording data to or reproducing data from a disk comprising:

a head for writing the data into or reading the data out of the disk by sliding on said disk or gliding over said disk;

an arm member for holding said head;

support means for supporting said arm member via an elastic member so that said arm member can be raised or lowered;

load means for exerting a force on a first position of said arm member so as to place said head on the disk or to make said head approach the disk;

unload means for exerting a second force on a predetermined position of said arm member so as to separate said head from the disk, said predetermined position being more distant from said head than said first position from said head in a longitudinal direction of said arm member; and a restriction member for exerting a third force on said arm member so as to restrict a position of said arm member in a direction in which said arm member is moved to be separated from the disk.

4. A disk drive as claimed in claim 3, wherein a position on which said third force is exerted is closer to said head than said predetermined position to said head.

5. A disk drive as claimed in claim 4, wherein said restriction member is provided on a guide member which can move with supporting the disk when said disk is installed in or removed from said disk drive.

6. A disk drive as claimed in claim 4, wherein said restriction member is provided on a carriage for carrying said head.

7. A disk drive as claimed in claim 4, wherein said restriction member is provided on a case member of said disk drive.

8. A disk drive as claimed in claim 7, wherein a reinforcing member for said case member constitutes said restriction member.

9. A disk drive as claimed in claim 4, wherein said restriction member makes contact with a pin which is provided on said arm member so that said restriction member restricts said position.

10. A disk drive as claimed in claim 9, wherein said pin is rotatably provided.

11. A disk drive for recording data to or reproducing data from a disk comprising:

a head for writing the data into or reading the data out of the disk by sliding on said disk or gliding over said disk;

an arm member for holding said head;

support means for supporting said arm member via an elastic member so that said arm member can be raised or lowered;

load means for exerting a force on a first position of said arm member so as to place said head on the disk or to make said head approach the disk;

unload means for exerting a force on a second position of said arm member so as to separate said head from the disk, said second position being more distant from said head than said first position from said head in a longitudinal direction of said arm member, and a cover member of said disk drive for making contact with said arm member so as to restrict a position of said arm member in a direction in which said arm member is moved to be separated from the disk.

12. A disk drive as claimed in claim 11, wherein a rib formed on said cover member makes contact with said arm member.

13. A disk drive as claimed in claim 12, wherein said rib makes contact with a boss provided on said arm member.

14. A disk drive as claimed in claim 11, wherein a convex portion provided on said arm member makes contact with said cover member.

15. A disk drive as claimed in claim 11, wherein a thin member which constitutes a part of said cover member, and thickness of which is thinner than that of other part of said cover member, makes contact with said arm member.

16. A disk drive for recording data to or reproducing data from a disk comprising:

a head for writing the data into or reading the data out of the disk by sliding on said disk or gliding over said disk;

an arm member for holding said head;

support means for supporting said arm member via an elastic member so that said arm member can be raised or lowered;

load means for exerting a force on a first position of a said arm member so as to place said head on the disk or to make said head approach the disk;

unload means for exerting a force on a second position of said arm member so as to separate said head from the disk, said second position being more distant from said head than said first position from said head in a longitudinal direction of said arm member, and a restriction member which makes contact with said arm member at a separate point from a point at which said head slides on or glides over the disk, so as to restrict a position of said arm member in a direction in which said arm member is moved to be separated from the disk.

* * * * *